(12) United States Patent
Freeman et al.

(10) Patent No.: US 12,235,446 B2
(45) Date of Patent: Feb. 25, 2025

(54) WEARABLE IMAGE MANIPULATION AND CONTROL SYSTEM WITH HIGH RESOLUTION MICRO-DISPLAYS AND DYNAMIC OPACITY AUGMENTATION IN AUGMENTED REALITY GLASSES

(71) Applicant: Raytrx, LLC, Tulsa, OK (US)

(72) Inventors: Michael Hayes Freeman, Tulsa, OK (US); Richard C. Freeman, Tulsa, OK (US); Mitchael C. Freeman, Sapulpa, OK (US); Chad Boss, Tulsa, OK (US); Jordan Boss, Tulsa, OK (US); Brian Santee, Tulsa, OK (US); David Cary, Tulsa, OK (US)

(73) Assignee: RAYTRX, LLC, Tulsa, OK (US)

( * ) Notice: Subject to any disclaimer, the term of this patent is extended or adjusted under 35 U.S.C. 154(b) by 758 days.

(21) Appl. No.: 17/329,549

(22) Filed: May 25, 2021

(65) Prior Publication Data
US 2021/0382311 A1    Dec. 9, 2021

Related U.S. Application Data

(63) Continuation of application No. 16/511,451, filed on Jul. 15, 2019, now Pat. No. 11,016,302, and a
(Continued)

(51) Int. Cl.
*G02B 27/01* (2006.01)
*G06F 3/01* (2006.01)
(Continued)

(52) U.S. Cl.
CPC ......... *G02B 27/0172* (2013.01); *G06F 3/013* (2013.01); *G09G 5/003* (2013.01);
(Continued)

(58) Field of Classification Search
CPC ........ G02B 27/0172; G02B 2027/0138; G02B 27/0176; G02B 2027/0134;
(Continued)

(56) References Cited

U.S. PATENT DOCUMENTS 6,154,321 A    11/2000  Melville et al.
9,651,786 B1    5/2017  Browne
(Continued)

FOREIGN PATENT DOCUMENTS

CN    105188516 A    12/2015
DE    695 30 170 T2    1/2004
(Continued)

OTHER PUBLICATIONS

Extended European Search Report in European Patent Application No. 19833423.7; dated Aug. 20, 2022.
(Continued)

*Primary Examiner* — Brandi N Thomas
(74) *Attorney, Agent, or Firm* — Howard & Howard Attorneys PLLC

(57) ABSTRACT

A mixed reality display comprising: at least one lens, where the at least one lens has a reflective element, the at least one lens comprising a plurality of pixels; at least one display capable of projecting one or more images onto at least a portion of the at least one lens; and a dynamic opacity system, where the dynamic opacity system is capable of making at least one pixel opaque in the portion of the at least one lens onto which the one or more images are projected, while any portion of the at least one lens onto which no image is projected remains see-through.

8 Claims, 15 Drawing Sheets

Related U.S. Application Data continuation-in-part of application No. 16/511,202, filed on Jul. 15, 2019, now Pat. No. 11,461,936, and a continuation-in-part of application No. 15/073,144, filed on Mar. 17, 2016, now Pat. No. 9,955,862, and a continuation-in-part of application No. 15/940,561, filed on Mar. 29, 2018, now Pat. No. 10,111,583, and a continuation-in-part of application No. 16/173,719, filed on Oct. 29, 2018, now Pat. No. 10,874,297, and a continuation-in-part of application No. 15/962,661, filed on Apr. 25, 2018, now Pat. No. 11,956,414.

(60) Provisional application No. 62/697,854, filed on Jul. 13, 2018, provisional application No. 62/489,801, filed on Apr. 25, 2017, provisional application No. 62/134,422, filed on Mar. 17, 2015.

(51) Int. Cl.
*G09G 5/00* (2006.01)
*G09G 5/377* (2006.01)

(52) U.S. Cl.
CPC ...... *G09G 5/377* (2013.01); *G02B 2027/0118* (2013.01); *G02B 2027/0138* (2013.01); *G09G 2354/00* (2013.01)

(58) Field of Classification Search
CPC .......... G02B 27/0093; G02B 2027/014; G02B 27/017; G02B 2027/0159; G02B 30/35; G02B 7/026; G02B 13/0085; G02B 7/003; G02B 7/021; G02B 7/022; G02B 2027/0118; G02B 2027/0178; G02B 27/62; G02B 3/0068; G02B 3/0075; G02B 2027/0187; G02B 27/0101; G02B 2027/011; G02B 2027/013; G02B 2027/015; G02B 6/4256; G02B 6/4274; G02B 7/12; G02B 21/365; G02B 3/12; G02B 2027/0123; G02B 2027/0129; G02B 2027/0147; G02B 21/0012; G02B 30/10; G02B 30/25; G02B 30/26; G02B 30/29; G02B 30/33; G02B 5/005; G02B 5/10; G02B 13/006; G02B 2027/0132; G02B 2027/0174; G02B 2027/0181; G02B 3/00; G02B 5/23; G02B 5/3025; G06F 3/013; G06F 3/012; G06F 3/011; G06F 3/0346; G06F 3/04812; G06F 3/017; G06F 3/04815; G06F 3/14; G06F 17/16; G06F 3/015; G06F 3/0304; G06T 19/006; G06T 7/50; G06T 17/05; G06T 2207/30244; G06T 7/337; G06T 7/74; G06T 2207/10028; G06T 2207/10048; G06T 5/50; G06T 7/11; G06T 7/33; G06T 11/00; G06T 2207/10016; G06T 7/246; G06T 7/277; G06T 7/55; G06T 7/73; G06T 15/005; G06T 15/20; G06T 17/20; G06T 19/20; G06T 2219/024; G06T 2219/2016; G06T 3/08; A61B 2017/00216; A61B 2090/365; A61B 2090/372; A61B 90/25; A61B 2090/502; A61B 90/37; A61B 90/39; A61B 90/50; A61B 34/30; A61B 2017/00203; A61B 2017/00207; A61B 2034/2048; A61B 2034/2065; A61B 2090/371; A61B 3/113; A61B 90/20; A61B 90/36; A61B 2090/363; A61B 2560/0437; A61B 3/0025; A61B 3/024; A61B 3/032; A61B 3/12; A61B 50/13; A61B 90/30; A61B 90/361

See application file for complete search history.

(56) References Cited

U.S. PATENT DOCUMENTS

| | | |
|---|---|---|
| 10,323,904 B1 | 6/2019 | Batten |
| 2002/0063807 A1 | 5/2002 | Margulis |
| 2003/0223038 A1 | 12/2003 | Alster et al. |
| 2005/0036109 A1 | 2/2005 | Blum et al. |
| 2005/0280603 A1 | 12/2005 | Aughey et al. |
| 2009/0218400 A1 | 9/2009 | Boss et al. |
| 2010/0011959 A1 | 1/2010 | Marra |
| 2010/0149073 A1 | 6/2010 | Chaum et al. |
| 2012/0281181 A1 | 11/2012 | Chen et al. |
| 2013/0113977 A1 | 5/2013 | Miao |
| 2013/0172902 A1 | 7/2013 | Lightcap et al. |
| 2013/0215147 A1 | 8/2013 | Hilkes et al. |
| 2013/0329190 A1 | 12/2013 | Lewis et al. |
| 2013/0335543 A1 | 12/2013 | Hilkes et al. |
| 2014/0094655 A1 | 4/2014 | Newman |
| 2014/0098226 A1 | 4/2014 | Pletcher et al. |
| 2014/0146394 A1 | 5/2014 | Tout et al. |
| 2014/0160264 A1 | 6/2014 | Taylor et al. |
| 2014/0275760 A1 | 9/2014 | Lee et al. |
| 2014/0283429 A1 | 9/2014 | Sullivan et al. |
| 2014/0327792 A1* | 11/2014 | Mulloni ................ H04N 23/69 348/211.8 |
| 2014/0372944 A1* | 12/2014 | Mulcahy ................ G06F 3/012 715/810 |
| 2015/0193984 A1 | 7/2015 | Bar-Zeev et al. |
| 2015/0355481 A1 | 12/2015 | Hilkes et al. |
| 2016/0037849 A1 | 2/2016 | Shearman et al. |
| 2016/0091968 A1 | 3/2016 | Angelo et al. |
| 2016/0247418 A1 | 8/2016 | Folzenlogen et al. |
| 2016/0252325 A1 | 9/2016 | Sammut et al. |
| 2016/0262608 A1 | 9/2016 | Krueger |
| 2016/0270648 A1 | 9/2016 | Freeman et al. |
| 2016/0270656 A1 | 9/2016 | Samec et al. |
| 2017/0007351 A1 | 1/2017 | Yu |
| 2017/0011706 A1 | 1/2017 | Namkung et al. |
| 2017/0068119 A1 | 3/2017 | Antaki et al. |
| 2017/0094167 A1 | 3/2017 | Riedel |
| 2017/0293380 A1 | 10/2017 | Chauveau et al. |
| 2017/0323615 A1 | 11/2017 | Hazra et al. |
| 2018/0116742 A1 | 5/2018 | Dell et al. |
| 2018/0250085 A1 | 9/2018 | Simi et al. |
| 2019/0353457 A1 | 11/2019 | Northrup |
| 2021/0022599 A1 | 1/2021 | Freeman et al. |
| 2021/0149173 A1 | 5/2021 | Knoblich et al. |

FOREIGN PATENT DOCUMENTS

| | | |
|---|---|---|
| EP | 4052647 | 9/2022 |
| JP | H09245195 | 9/1997 |
| JP | 2009-523563 A | 6/2009 |
| WO | 2014140849 A2 | 9/2014 |

OTHER PUBLICATIONS

Office Action received in Chinese Patent Application No. 2018800416969; dated Jan. 12, 2023.

European Report in European Patent Application No. 18790963.5; dated Jun. 5, 2023.

\* cited by examiner 801
505
506

804
803
802

Figure 9
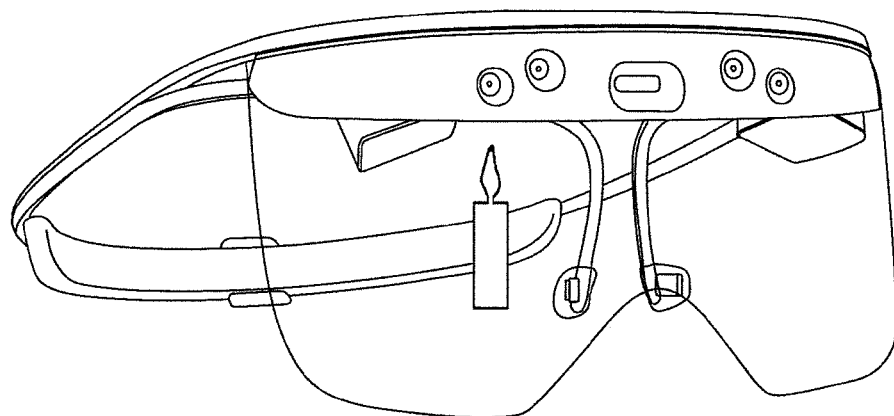
901
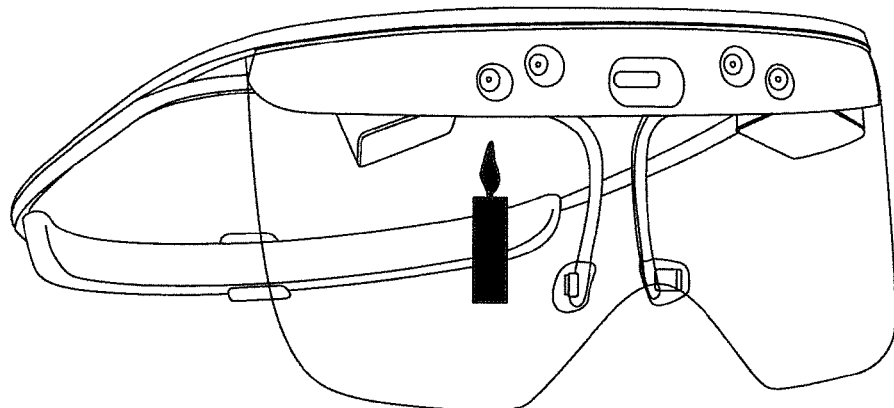
902
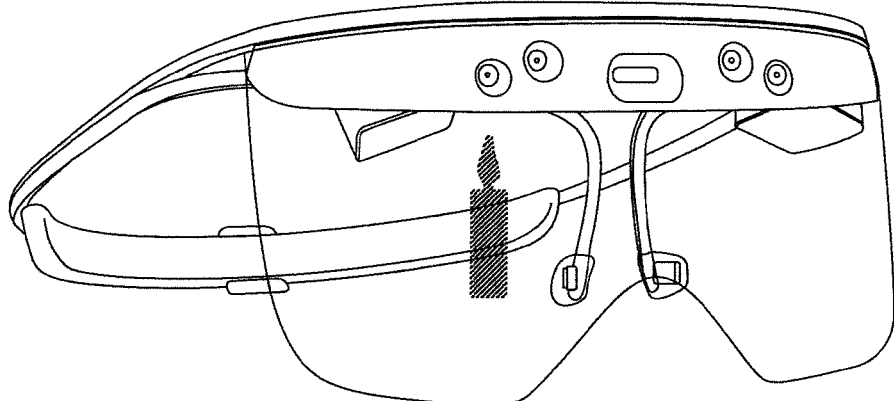
903

Figure 13
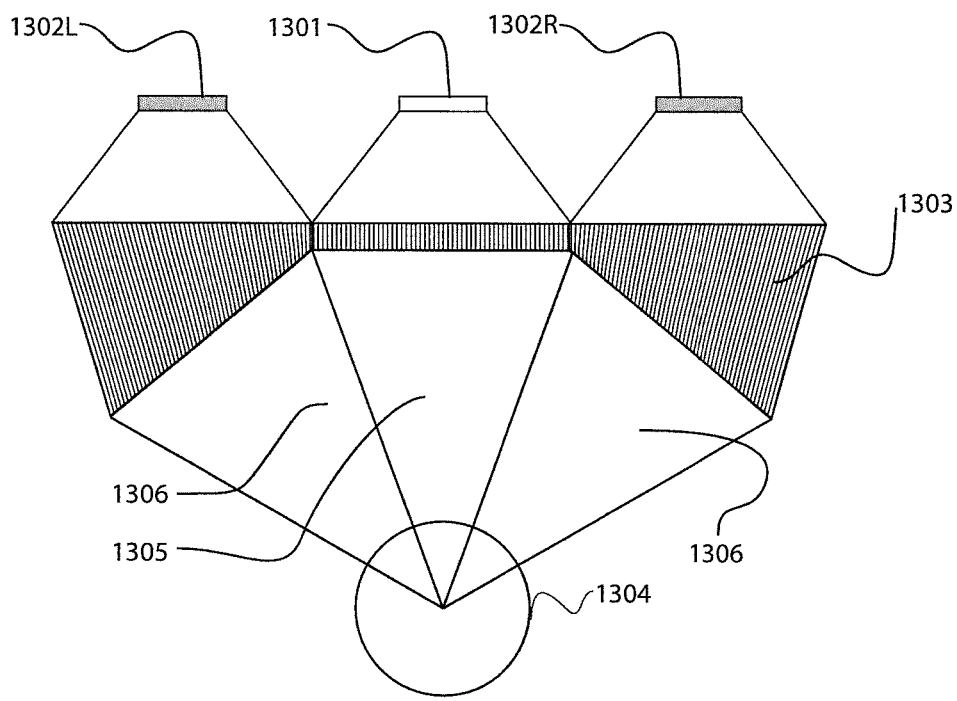
Figure 13a
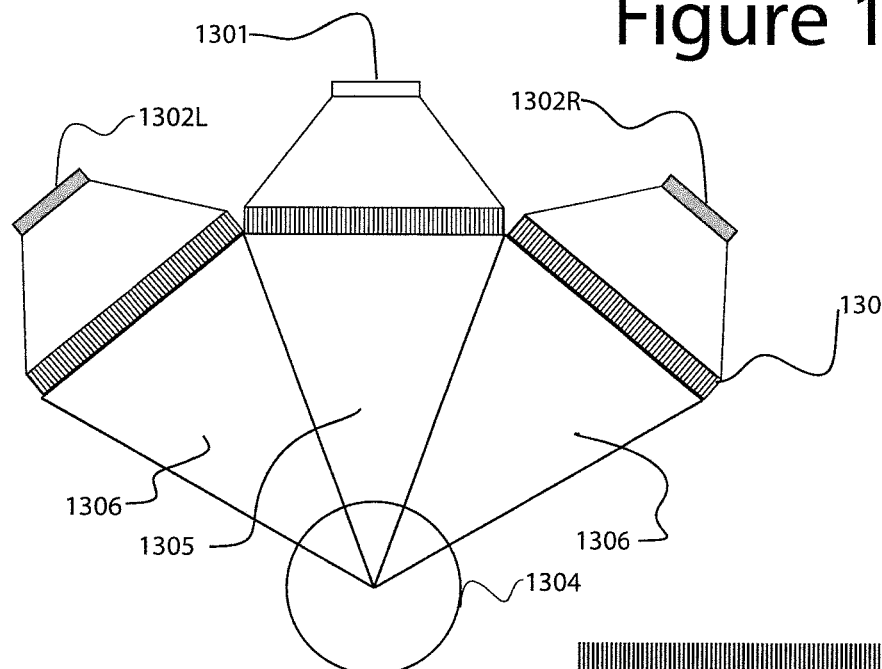
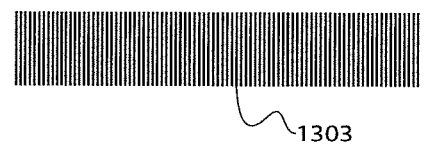

WEARABLE IMAGE MANIPULATION AND CONTROL SYSTEM WITH HIGH RESOLUTION MICRO-DISPLAYS AND DYNAMIC OPACITY AUGMENTATION IN AUGMENTED REALITY GLASSES

CROSS REFERENCE

This application is a continuation of U.S. patent application Ser. No. 16/511,451 filed Jul. 15, 2019, which is based on and claims priority to U.S. Provisional Patent Application No. 62/697,854 filed Jul. 13, 2018 and is a continuation-in-part of U.S. patent application Ser. No. 16/511,202 filed Jul. 15, 2019. This application is also a continuation-in-part of U.S. patent application Ser. No. 15/073,144 filed Mar. 17, 2016, which issued on May 1, 2018 as U.S. Pat. No. 9,955,862, U.S. patent application Ser. No. 15/940,561 filed Mar. 29, 2018, which issued on Oct. 30, 2018 as U.S. Pat. No. 10,111,583, and U.S. patent application Ser. No. 16/173,719 filed Oct. 29, 2018, all of which claim the benefit of U.S. Provisional Patent Application No. 62/134,422 filed Mar. 17, 2015; and of U.S. patent application Ser. No. 15/962,661 filed Apr. 25, 2018, which claims the benefit of U.S. Provisional Patent Application No. 62/489,801 filed Apr. 25, 2017. All are incorporated herein by reference.

COPYRIGHT NOTICE

A portion of this disclosure contains material that is subject to copyright protection. The copyright owner has no objection to the facsimile reproduction by anyone of this patent document as it appears in the U.S. Patent and Trademark Office, patent file, or records, but reserves all copyrights whatsoever in the subject matter presented herein.

BACKGROUND OF THE INVENTION

Field of the Invention

The present invention relates generally to improvements in augmented reality (AR) glasses, and more particularly, but not by way of limitation, to various head mounted displays that utilize lenses with a dynamic opacity or alpha matte layer to enhance the perception of the virtual image over real world video or images that are also visible through the wearable device.

Description of the Related Art

When using a reflected image on see-through lenses in sunlight or brighter lighting conditions or in ambient light, augmented reality or virtual reality type glasses often encounter a problem: the projected AR/VR image is washed out. The typical solution is to make the lens be shaded all the time, which makes the wearer vulnerable to falls or trips over unseen obstacles.

Based on the foregoing, it is desirable to provide a head mounted display with lenses that are not shaded all of the time, but rather become opaque only when and where needed, leaving the remainder of the lens clear.

SUMMARY OF THE INVENTION

In general, in a first aspect, the invention relates to a computer, smartphone, head mounted display (HMD), or other wearable device which, in its preferred embodiment, uses augmented reality such as an AR/VR type of glasses and reflective free-form optical lens(es) together with new software and hardware to achieve the desired effect. This patent teaches how to make a layer or separate lens combined with the original reflective or see-through lens opaque, so as to render the HMD essentially a virtual reality (VR) device, making the augmented reality (AR) device a true AR/VR or mixed reality HMD or glasses. This is akin to silhouetting an original image, where the original image is on the reflected layer of the HMD and the silhouette is on another layer. Another way to explain this process is that it is like alpha compositing, meaning that it is the process of combining an original image with an alpha matte image with either full or partial transparency. Mixed reality, as used herein, is defined as an HMD which has the features of either an augmented reality headset, which may contain both elements of virtual reality and real reality (RR); a virtual reality headset; an extended reality headset; or any combination of the three. Mixed reality may involve the combination or features of a computer, smartphone, mobile VR headset, AR glasses, and/or VR glasses into a single mixed reality XR wearable, where mixed reality is sometimes called XR in the industry. Any time this patent states augmented reality or virtual reality or extended reality or mixed reality, it means one or all of these types, as the patent may be applicable or may create one or more or all of the above. The image created and which augments RR is described as the "virtual image(s)."

In this patent, the alpha matte may be called by its trade name, Dynamic Opacity™ technology, and the active matrix combined with intelligence may be also called Optrx™ technology. Here the terms are used interchangeably. This new and unique technology, when applied to a head mounted display of either augmented reality or virtual reality type glasses, may solve the typical problem encountered when using a reflected image on see-through lenses in sunlight or brighter lighting conditions or in ambient light where the projected AR/VR image can otherwise be washed out.

Instead of having the lens be shaded all the time, which makes the wearer vulnerable to falls or trips over unseen obstacles, the alpha matte technology may only obscure that portion of the lens where the eyes are viewing the video, as in alpha matte composites, meaning the combining of several images from different sources into a single image. This may make the viewed virtual image have a silhouette or shadow, which causes it to be brighter and better seen than the RR. Additionally, shaders, edge enhancement, and brightness/contrast features may be used.

The alpha matte software may work in conjunction with eye-tracking technology and software to map the user's eye gaze and adjust not only the video, but move or vary the opacity on the exterior of the lens where the eyes are gazing. In addition, the brightness of the alpha matte display may be adjusted up or down to meet ambient lighting conditions.

Optrx alpha matte software may work in conjunction with EYETRX™ eye-tracking software to map the user's eye gaze and adjust not only the reflected image(s) or video but also the Optrx alpha matte image located on the separate plane to keep the alpha combined image all aligned with the eye/eye-box. Thus, the eye-gaze and the Optrx alpha matte layer may be controlled by the eye-tracking software to always be in sync. In this patent, the AR, VR, XR, or MR images or video to be displayed are all referred herein as "virtual image."

Alternatively, the adjustment may be programmed into the system controller and automatically adjust depending on what the sensors say the brightness of the ambient light is, which would typically be brighter when in the brighter exterior light. With the Optrx alpha matte, the reflected display may have a buffer between it and exterior light, which may give the reflected display greater brightness to the eye. Under this invention, the Optrx alpha matte may be enabled automatically, under pre-set conditions, or manually or with voice command such as "turn on VR" and may make the entire collector lens opaque, which converts the Oculenz AR headset into a true VR platform.

While others, like HoloLens and Magic Leap, solve this problem by blocking up to 60-85% of the ambient light so that the augmented reality image(s) can be seen, alpha matte technology may simply alpha matte the image with an additional layer of pixelization on the opposite side of the image as viewed by the user, so that the augmented reality image is brighter and more readily seeable than the real world (real reality—RR) image behind it. Thus, instead of having the lens be shaded all the time, which may make the wearer vulnerable to falls or trips over unseen obstacles, the Optrx alpha matte technology may only obscure that portion of the lens where the eyes are viewing the augmented reality portion of the RR video feed.

In this patent, the term "reflected image" typically means the displayed image(s) that are reflected on the collector lens, and being the reflection meaning the change in direction of light or chromatic light rays or photons. Herein the term "reflected image" is also used to mean the augmented reality and/or virtual reality image projected onto the display/collector lens, and sometimes called herein the "virtual image," which is reflected into the eyes. However, in terms of this patent, "reflected image" may also include a non-virtual image region of interest, which may include the reflected image plus a portion of the real reality see-through image, or other independently defined region on the lens.

In addition, the brightness of the any of the planes, the reflected image, or the alpha matte image or pixels may be adjusted up or down to meet ambient lighting conditions. Alternatively, the adjustment can be programmed into the system controller and automatically adjust based on the input from various ambient light and/or brightness, depending on what the sensors say the brightness of the ambient light is, which would typically be brighter when in the brighter exterior light. With the Optrx alpha matte, the reflected display may have a buffer between it and exterior light, which gives the reflected display greater brightness to the eye. Alternatively, the user can use voice commands to which the audio command and control software in the MVC respond to, such as "turn on VR," and thus the response from the HMD or glasses may makes the entire lens opaque, may converting the Oculenz AR headset into a true VR platform. Likewise, a voice command such as "turn on AR" may return the HMD or glasses to see-through.

As opposed to AR products such as Magic Leap and Microsoft HoloLens 1 & 2, the Oculenz Optrx alpha matte may permit a greater pass-through of ambient light and RR vision through its lenses. On the other hand, competitor products like Magic Leap must block 85% of the real-world light in order for the user to see the augmented/virtual images. Likewise, Guttag states that the HoloLens 2 has to "block[s] about 60% of ambient light" in order to work. Many commentators have noted that most of the augmented reality products available on the market intensely block RR ambient light (Magic Leap, HoloLens 2, ODG, NReal, etc.) which many claim make it hard to recommend those AR products for physical tasks where there is interaction with the RR environment; and are better used for more VR-like gaming or entertainment scenarios. Thus, the Optrx alpha matte may provide a new and unique feature which permits an AR user to see virtual images even in bright or daylight type of environments and makes it easy to use the for intense intention with the outdoor RR environment, such as on job-sites or other locations like a chemical plant or oil rig.

This patent also teaches how to achieve a very-high resolution, including 60 pixels per degree, which is the highest resolution a human eye can see at 20/20, and very large the largest field of view (FOV), which is very difficult to attain with a single display, in an HMD by using two or more displays per eye arranged in such a way that a freeform catoptric, or catadioptric system, effectively merges them into a single virtual augmented with hyper-concentration of pixels from the multiple displays through a collimator subsystem to concentrate rays from the multiple displays in the eye-box, while utilizing less resolution in the periphery for an overall highest resolution and FOV.

BRIEF DESCRIPTION OF THE DRAWINGS

It is appreciated that the figures provided herewith are for explanation purposes to persons ordinarily skilled in the art, and that the drawings are not necessarily drawn to scale. Other advantages of the present disclosure will be readily appreciated, as the same becomes better understood by reference to the following detailed description when considered in connection with the accompanying drawings.

Non-limiting and non-exhaustive embodiments of the present invention are described with reference to the following figures, wherein like reference numerals refer to like parts throughout the various views, unless otherwise specified:

FIG. 5A is an exploded view of the layers of the lens;

FIG. 5B is a detailed exploded view of the lens sublayers;

FIG. 6A is an exploded view of the layers of the lens;

FIG. 6B is a detailed exploded view of the lens sublayers;

FIG. 9 is a diagrammatic illustration of the general operation of the Optrx alpha matte composite subsystem;

FIG. 13 is a diagrammatic illustration of a low-high-low (LHL) optical engine with multiple displays, where one or more displays have greater pixel density than one or more of the other displays and contains one or more corrective lenses and collimators;

FIG. 13a is a diagrammatic illustration of the same configuration except that the displays are situated radially around the eye;

Figure 1:
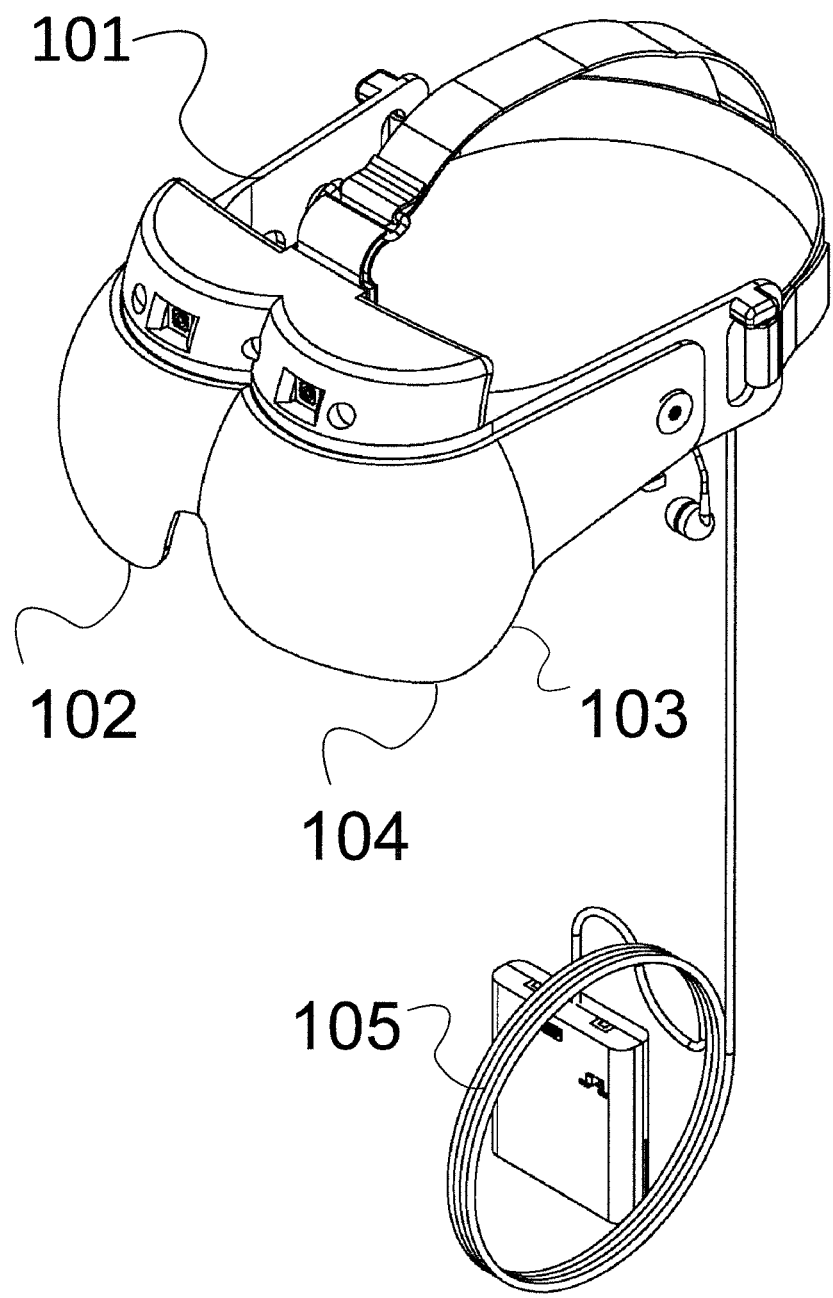
FIG. 1 is a picture of one version of one embodiment of a head mounted display (HMD) with a battery/circuit dongle, according to an embodiment of the present invention, with the layered lenses and a collimator feature on the lens with an optional dongle in which can be housed a battery, micro circuits, and a controller, such as a D-PAD or other controller.
Figure 2:
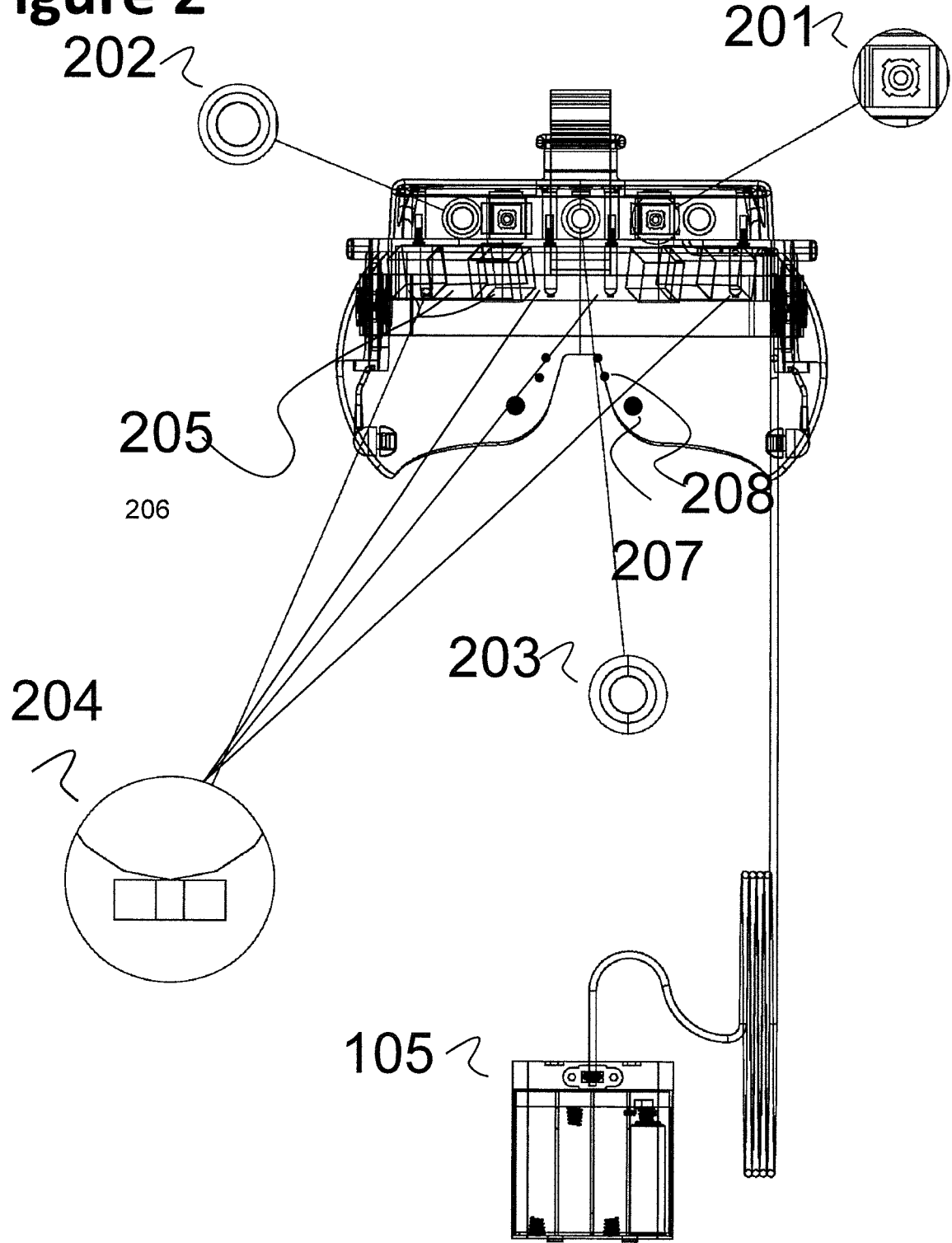
FIG. 2 is a diagrammatic illustration of the high-resolution cameras, multiple displays per eye, 6 to 9 degrees of freedom sensor or other sensors such are necessary for hand-gesturing, head-gesturing, voice control, positional location, and estimation or navigation, optical character recognition (OCR), marker-based or markerless-based AR, location, SLAM sensors, concurrent odometry and mapping sensors, microphones and noise-cancelling microphones, and any other sensors which could be used on an AR/VR headset, and well as a diagrammatic illustration of a placement of an IR light for the eye-tracking subsystem.
Figure 3:
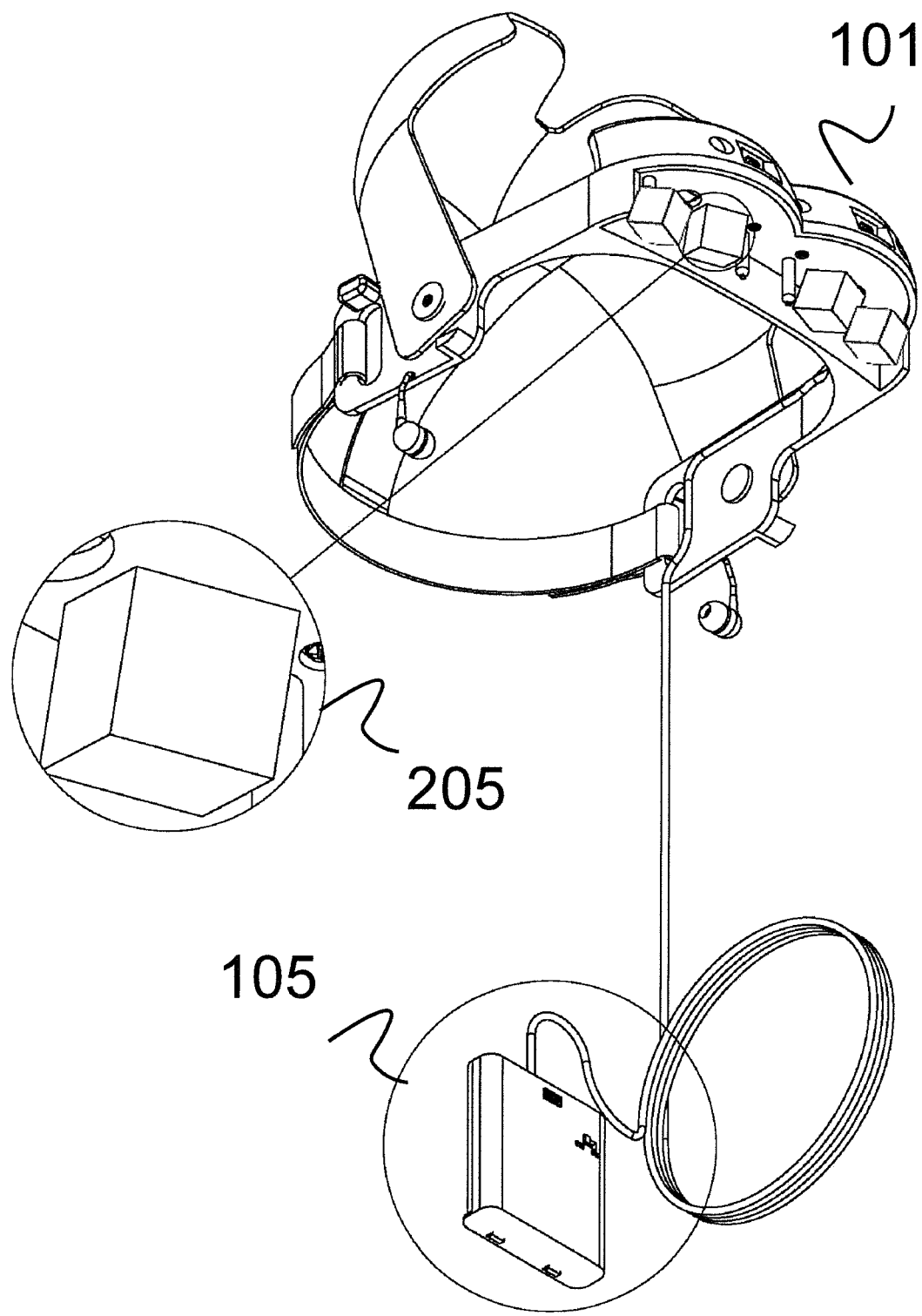
FIG. 3 is a diagrammatic illustration of the placement of one or more displays, projectors, or micro-displays per eye for projecting the image onto the lens(s)
Figure 4:
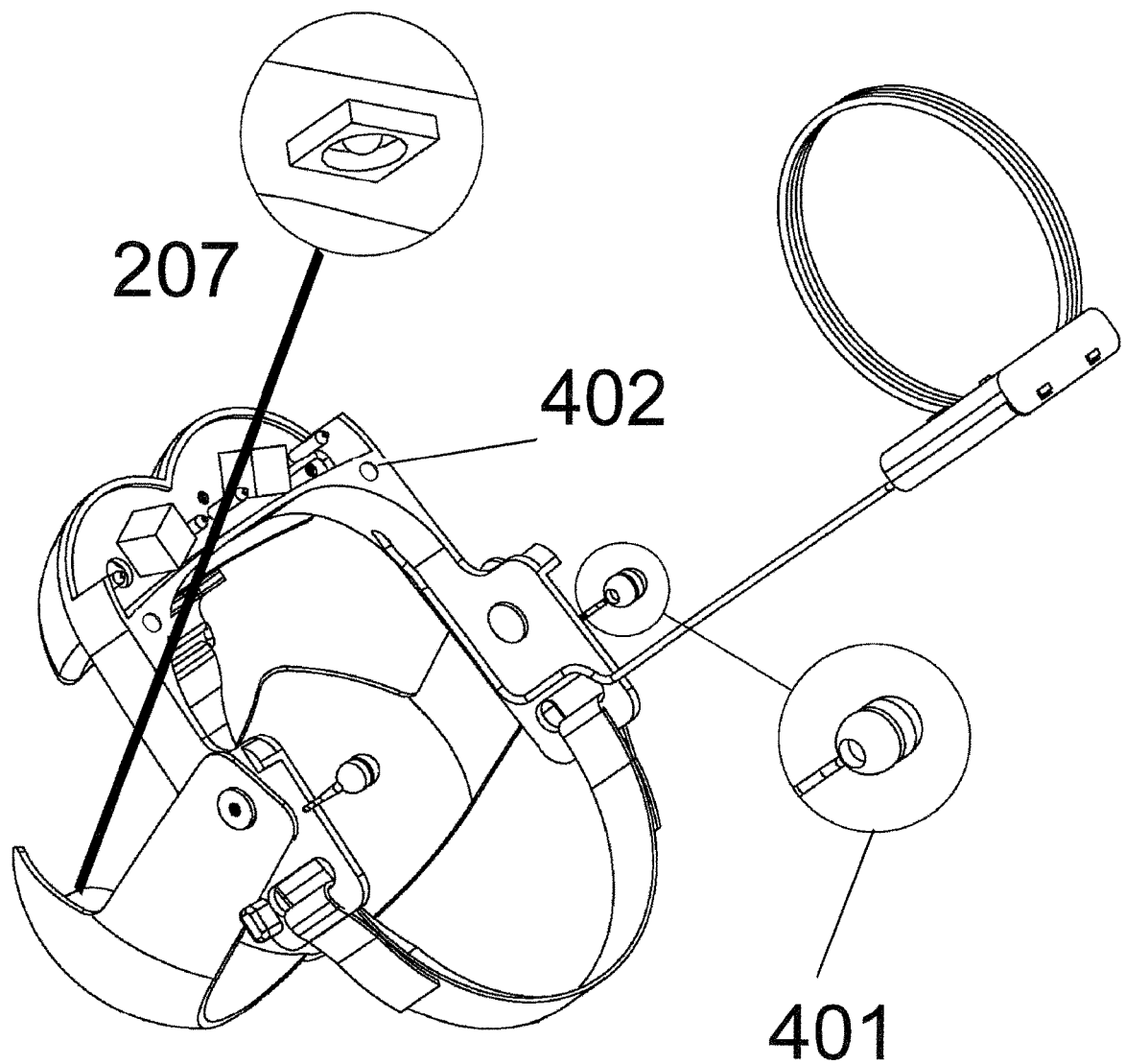
FIG. 4 is a diagrammatic illustration of the undercarriage of the HND and its components, including eye-tracking, physical sensors, and audio subsystem.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification. It will be apparent to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure, or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples.

Moreover, where the word "image" is used, this is meant to mean one or more images, which can be one or more static images, one or more video images, one or more dexel images, or a combination thereof. The image(s) can either be alone or on separate layers or combined for viewing in the eye-box. "Image" is also used herein to define a size, shape, pixelization, dexelization, or silhouette when used in reference to the Optrx alpha matte layer or plane.

Likewise, the coined term, "Dynamic Opacity™," "Optrx™" and/or "alpha matte layer" are all also synonymous with the scientific term of "variable opacity" meaning a layer in which the degree light is or is not allowed to travel through.

Several (or different) elements discussed herein and/or claimed are described as being "coupled," "in communication with," "integrated," or "configured to be in communication with" or a "system" or "subsystem" thereof. This terminology is intended to be non-limiting and, where appropriate, be interpreted to include, without limitation, wired and wireless communication using any one or a plurality of a suitable protocols, as well as communication methods that are constantly maintained, are made on a periodic basis, and/or made or initiated on an as-needed basis.

As used herein, "dexel" means "detector element" which is the analog of a pixel ("picture element") but native to a detector rather than a visible picture. This means that the dexel is a conversion equation, scaling, or oversampling of the pixels in the reflective layer. That is, it describes the elements in a detector, which may be processed, combined, resampled, or otherwise mangled or manipulated before creating an image or picture. As such, there may or may not be a one-to-one correspondence between the pixels in an image and the dexels used to create an image. A dexel may also mean an image or display which may be either real or virtual. For example, cameras labeled as "10-megapixel" can be used to create a 640×480 picture. Using dexel terminology, the camera actually uses 10 million dexels to create a picture with 640×480 pixels. Dexel can also be used to describe the mechanism for manipulating the pixels in the virtual display or reflective layer. Dexel is also is used to mean "depth pixel" which is a concept used for a discretized representation of functions defined on surfaces used in 3D modeling or geometrical modeling and physical simulation, sometimes also referred to as multilevel Z-map. For reference herein, any time pixel is mentioned it can also mean dexel.

Embodiments in accordance with the present invention may be embodied as an apparatus, method, computer program, hardware/software, and/or product. All of the systems and subsystems may exist, or portions of the systems and subsystems may exist to form the invention. Accordingly, the present invention may take the form of an entirely hardware embodiment, an entirely software embodiment (including firmware, resident software, micro-code, etc.), or an embodiment combining software and hardware aspects that may all generally be referred to herein as a "unit," "module," or "system." Furthermore, the present invention may take the form of a computer program product embodied in any tangible media of expression having computer-usable program code embodied in the media. Any combination of one or more computer-usable or computer-readable media (or medium) may be utilized. For example, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages. Further, the intelligence in the main circuitry may be software, firmware, or hardware, and can be microcontroller based or included in a state machine. The invention may be a combination of the above intelligence and memory and this can exist in a central processing unit or a multiple of chips including a central graphics chip. The computer portion of the invention may also include a model view controller (MVC) which is also called herein a "model controller."

Figure 12:
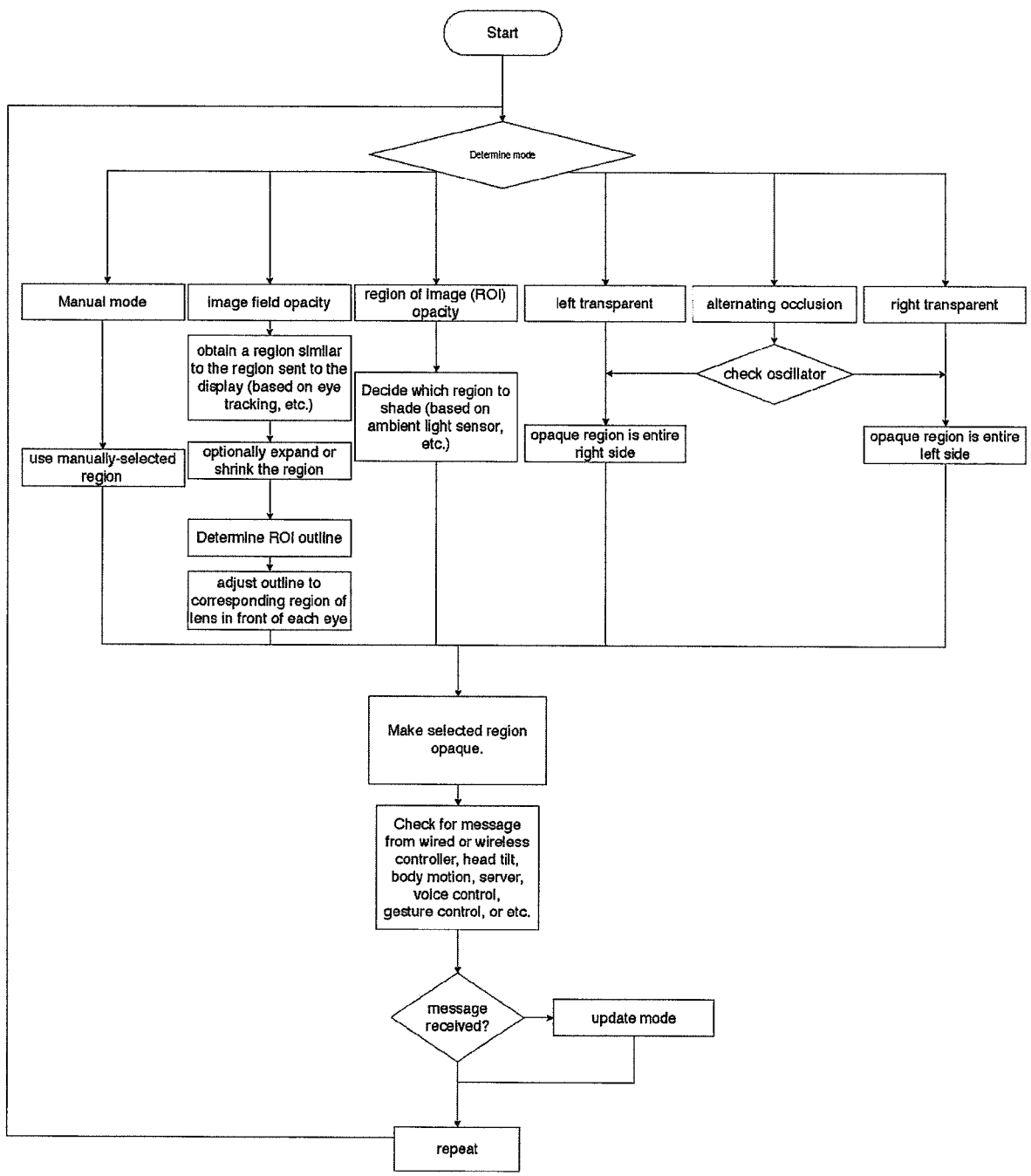
FIG. 12 is a flow chart showing the operation of the Optrx alpha matte OPTRX.

The flowchart in FIG. 12 and block diagrams in the flow diagrams illustrate the architecture, functionality, and operation of possible implementations of systems, methods, and computer program products according to various embodiments of the dynamic opacity invention.

Each block in the flowchart FIG. 12 or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture, including instruction means which implement the function/act specified in the flowchart and/or block diagram block or blocks.

There may be several major systems in this invention, as shown in FIGS. 1 through 11, and a number of subsystems which may be a part of the complete invention. One or more of the systems or subsystems may be combined, omitted, or integrated. The first major system is the glasses frame and headgear (HMD) 101/101a, which may be worn on the head of a user and positioned over the eyes and nose like typical glasses. The HND 101/101a may house the cameras, the microcontrollers, the connectors, and subsystems, which may be comprised of optical sensor technologies and an Optrx alpha matte layer subsystem and other sensors. In one embodiment, this invention may comprise a HMD system 101 having a database, a CPU, a GPU either internally or externally, other basic circuitry and memory, a model controller, one or more camera intakes, one or more displays, which can be LCD, OLED, MicroLED, LCoS, DMD, or other display technologies that would be suitable, and one or more free-form reflective lenses (the optical engine) which may use collimator(s) or optical collimator(s) to correct the image for projection. In some instances, the pixels may have to be light wave bent or altered before being collimated. Thus, one or more free-form reflective lenses may use collimator(s) to correct the image for projection onto the free-form reflective lens (the optical engine) together with controllers.

Figure 5:
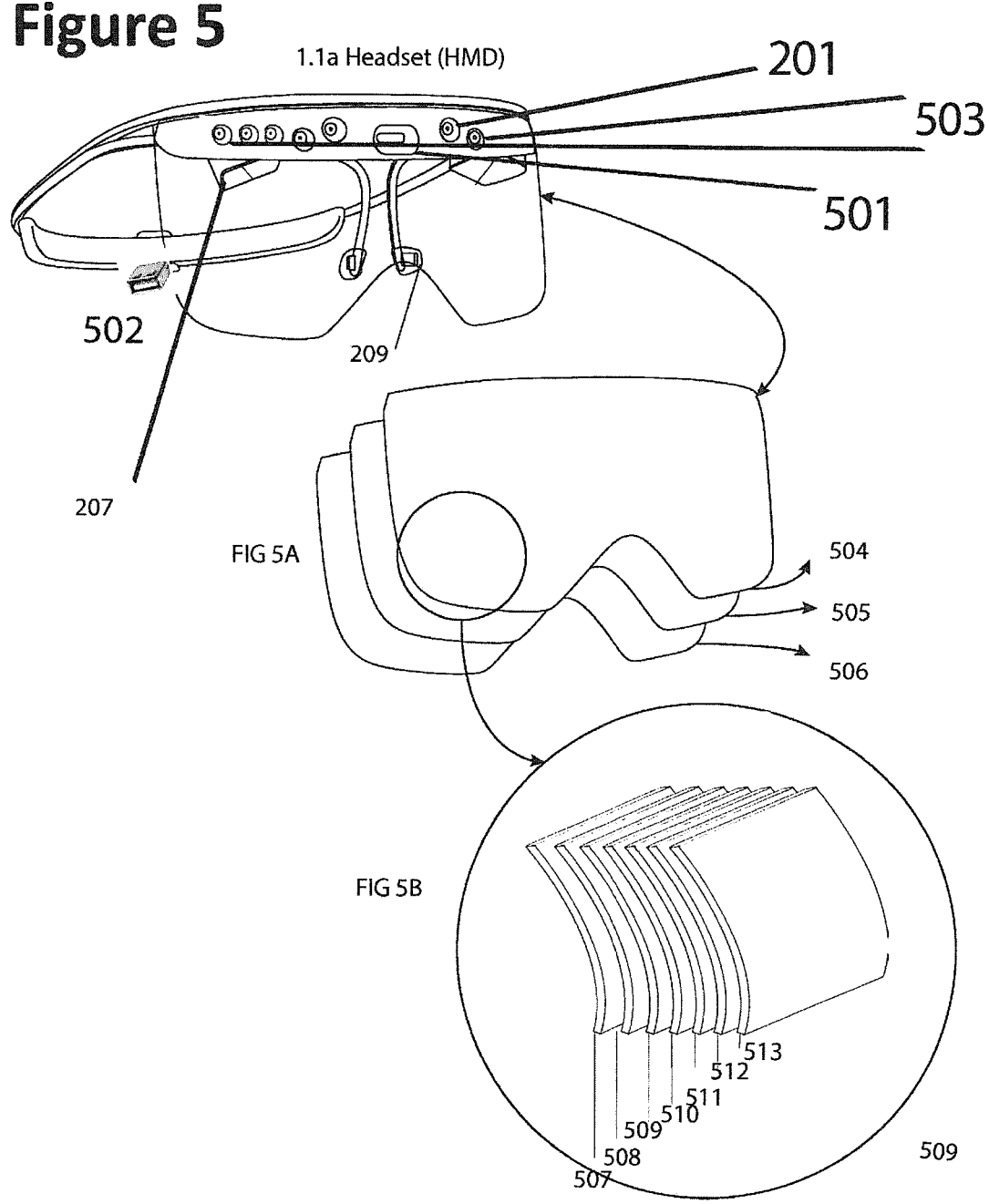
FIG. 5 is a diagrammatic illustration of the lenses in the HND based on LCP dynamic opacity, with the HND with combined lenses and its substrates.
Figure 6:
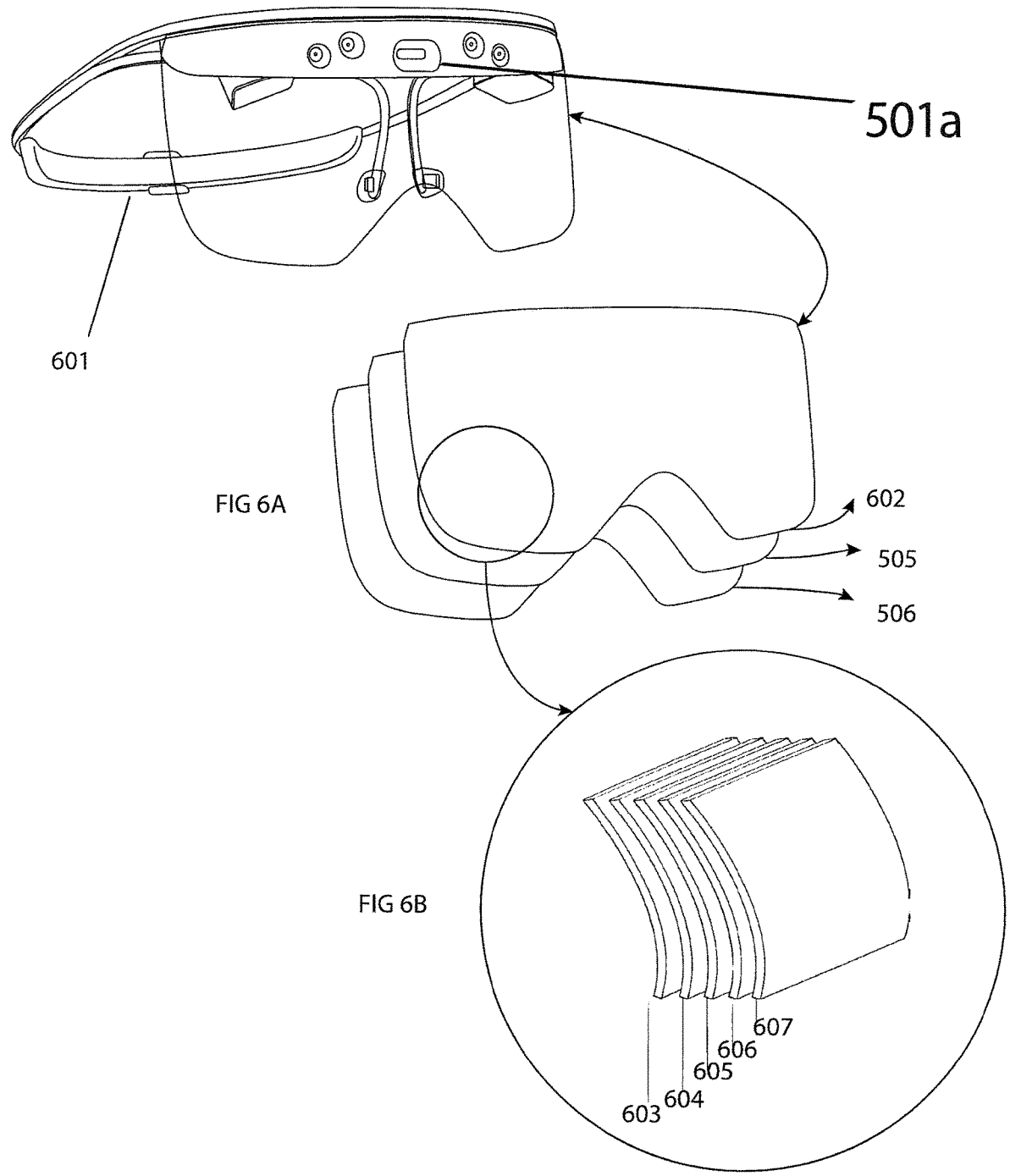
FIG. 6 is a diagrammatic illustration of the lenses in the HND based on Optrx alpha matte ChLCP, with its possible substrates.
Figures 7, 7A, 7B:
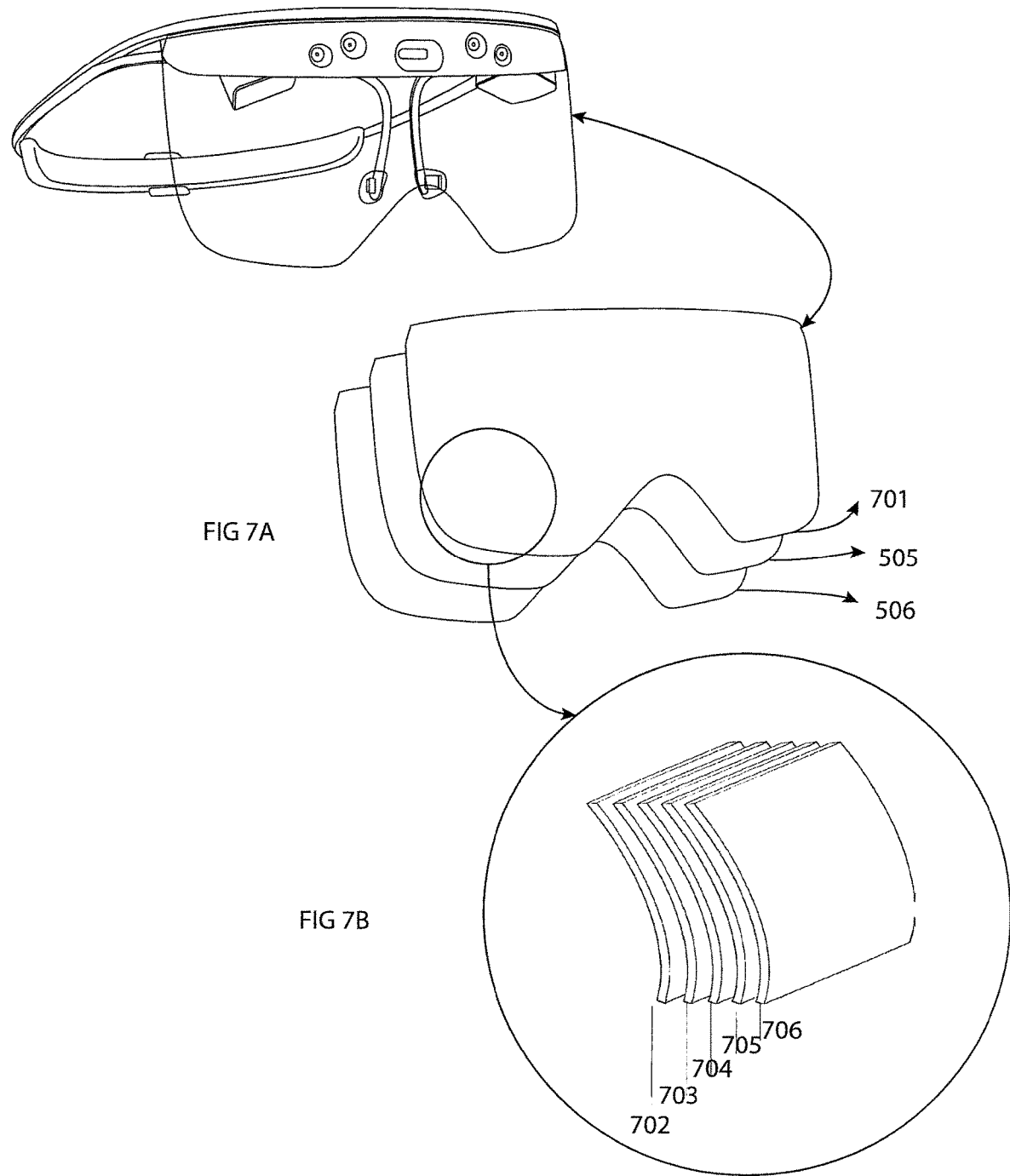
FIG. 7 is a diagrammatic illustration of the lenses in the HND based on OLED Optrx alpha matte and its possible substrates.
FIG. 7A is an exploded view of the layers of the lens.
FIG. 7B is a detailed exploded view of the lens sublayers.
Figures 8, 8A, 8B:
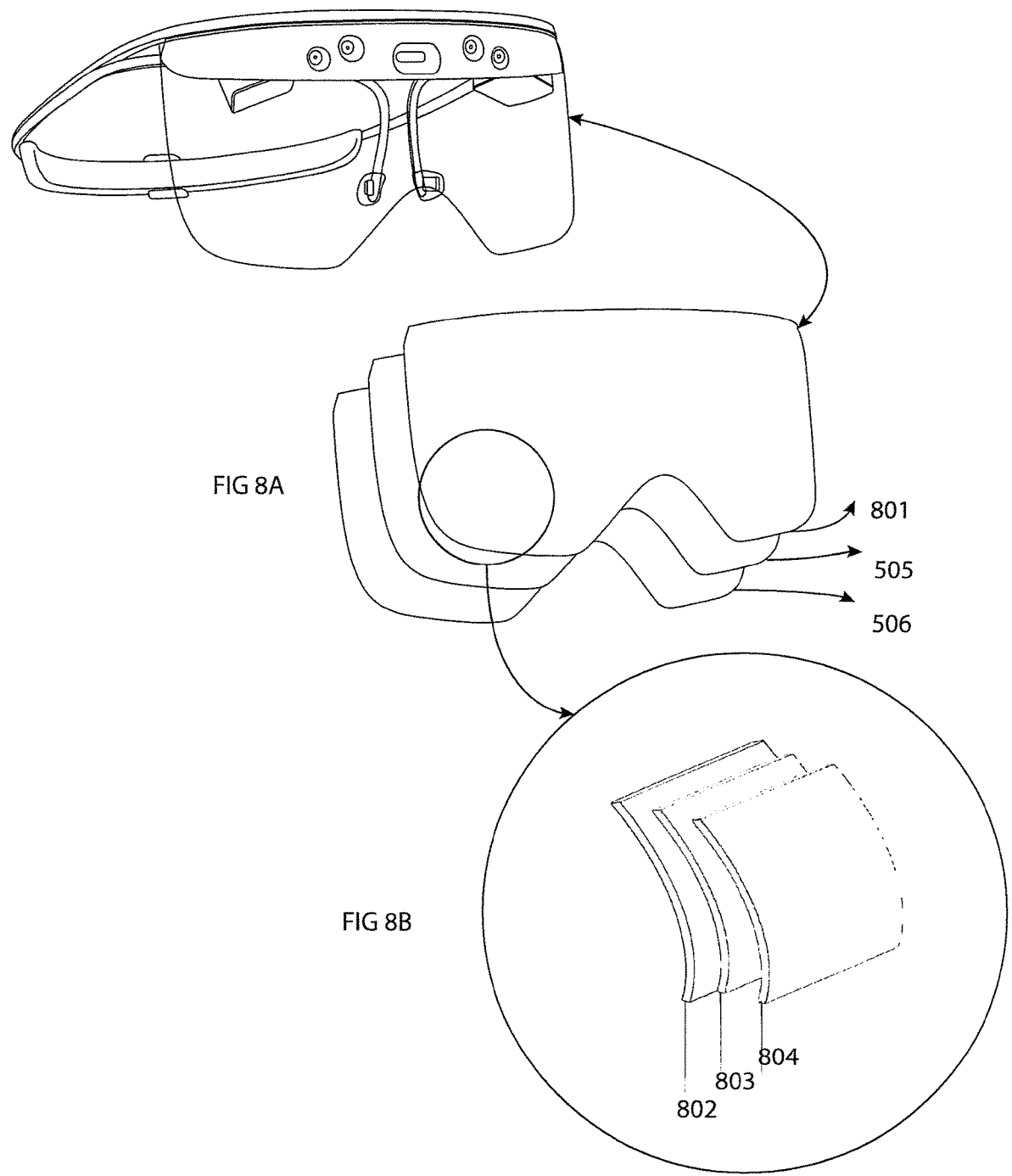
FIG. 8 is a diagrammatic illustration of the lenses in the HND based on photochromatic Optrx alpha and its potential substrates.
FIG. 8A is an exploded view of the layers of the lens.
FIG. 8B is a detailed exploded view of the lens sublayers.

In some instances, the display or reflective lens subsystem may have two or more sub-lenses combined, including (i) a reflective lens or coating on the (reflective) clear lens 103, which may also include aspects of a collimator, and which may also be a so manufactured to be a part and parcel of the collimator subsystem 102; and, (ii) a reflector lens 105, 505 to reflect the displayed image to the user, which may also include aspects of a collimator 102, and which may also be a so manufactured to be a part and parcel of the collimator subsystem 102; and (iii) an anti-reflective layer or optical coating 513 on the opposite side of the reflective side to avoid unwanted artifacts such as "ghosting;" and (vi) an alpha matte lens/subsystem. In this embodiment, optical coatings or films may be applied to the lens to enhance the displayed image and improve the user experience, as shown in FIG. 5. The coatings, reflective and anti-reflective, may be to improve contrast, reduce haziness, and reduce double or ghost images. The three (3) types of almost transparent coatings which may be applied on one of the exterior layers of the HMD may be either (i) reflective or semi-reflective 506, (ii) anti-reflective 513, which may reduce glare from ambient light, and/or (iii) semi-reflective, such as beam splitters, such as are in a teleprompter, or (iv) metal, which may be a thin, almost transparent, metal film contained within the lens, in which the glass is coated with, or has encased within, a thin and almost-transparent layer of metal (usually aluminum). The result may be a lightly mirrored surface that reflects some light and is penetrated by the majority of the ambient light being 60-98% of the ambient light. In this invention, these thin, almost transparent anti-reflective technologies may eliminate stray light patterns and can be adhered to the exterior or interior of the reflective layer or the exterior or interior of the Optrx exterior layer. The coatings and the reflective layer and Optrx layer may be manufactured as multi-layer optical stacks, and the reflective layer can also be manufactured to be a part of collimator subsystem to further focus the virtual image and/or the RR images.

The MVC, which may be hardware, firmware, software, memory, microcontroller, state machine, or a separate chipset, or a combination of any of the forgoing, may be coupled to the database and may be configured to establish the AR/VR image to be displayed in either 2D or 3D together with the RR layer and the creation of the Optrx alpha matte pixel layer 902.

This invention teaches that by adding a layer of either of a liquid crystal panel (LCP) 504 with its sublayers over the transparent layer 505; reflective coating 506; with its substrates: bottom polarizer 507, substrate 508, thin-film transistor 509, liquid crystal 510, common electrode layer 511, substrate 512, top polarizer layer 513; a ChLCP 602 layer containing its substrates: ChLCP substrate 603, thin-film transistor layer 604, liquid crystal layer 605, common electrode 606, exterior substrate 607; or transparent OLED (AMOLED) 701, with its substrates: OLED substrate 702, OLED thin-film transistors 703, OLED liquid crystals 704, OLED common electrode 705, external substrate 706; and finally a photochromic layer 801, with its substrates: interior substrate 802, dye layer 803, exterior layer 804 or other similar technique to the exterior of the HMD reflective lens. This is the layer upon wherein the HMD MVC intelligence (software plus hardware) may make the one or more of the alpha matte layer pixels/dexels opaque, a color, diffuse, or dark. In all instances but the instance of use of a photochromic layer, the Optrx alpha matte layers may be electronically controlled by the MVC by pixel and/or dexel.

In the instance of the photochromic layer 801, the shading may be controlled by how much chemical reaction there is relative to the ambient or sunlight such that the photochromic outer lens may darken with exposure to specific types of light of sufficient intensity, such as ultraviolet (UV) light. In the absence of the activating light waves, the photochromic outer lens may return to its static state of clear; when activated, it may turn a calculated amount of color or darkness, creating an automatic "sunglasses" effect. This may be accomplished by having one or more internal layers of very thin film containing photochromic molecules.

This invention may also include the novel idea of using the Optrx alpha matte layer in such a manner as to exhibit gradients from 0 to 100% or more of opacity, darkness, diffusion, or color in all or any area of the Optrx alpha matte layer. In this instance, part or all of the Optrx alpha matte lens or layer may be a certain percentage of color, opaque, dark, or diffused.

Through the MVC, this percentage may be 100% or may be lessened to 70%, 50%, or 30% for instance, or reverse, as required and instructed manually or as programmed for automatic response. Thus, this Optrx alpha matte layer and technology may avoid the necessity of having to include an additional "darkening" lens, like is used by Magic Leap®, ODG, HoloLens® and other AR manufactures to darken ambient light so as to seemingly "brighten" the augmented reality image versus the RR images seen by an AR/VR wearer. In addition, the Optrx alpha matte may make the AR glasses, when the Optrx alpha matte is set at 100%, an XR-virtual reality set of glasses (AR to VR=XR) as the user may not be able to "see" through the otherwise AR see-through lens at this Optrx alpha matte setting.

This patent teaches that in one embodiment of the invention, in the Optrx alpha matte layer the pixels may "match" or "mirror" or "alpha matte" the original pixels reflected on the reflective lens 1101 layer 1:1; or may be greater than the virtual image 1102, or less than the virtual image 1103, or can be used in combination with a darkening or opaqueness of a region of interest (ROI) 1104.

As shown in the MVC model FIG. 12, in the case of the 1:1 matching, the combination may have (i) a reflective layer (virtual image) pixel map, and (ii) an alpha matte pixel map (PO+PS) which may be created to match the reflective layer image.

In another embodiment of the invention, the Optrx alpha matte layer pixels may not match the original pixels the of the original pixels reflected on the reflective lens and may be created based on a ROI 1104.

The sensors may include motion sensors, 6 to 9 degrees of freedom sensors (generally an inertial measurement unit comprised of any number of accelerometers, gyroscopic sensors, and magnetometers), gesture recognition sensors, fiducial marker sensors, infrared sensors, alert sensors (which may alert a user to a danger), positional tracking sensors (including Wi-Fi location systems, Bluetooth location systems, mobile locations systems, and RFID location based systems), and sound sensors 401. The sensor array also can include mechanical linkages, magnetic sensors, optical sensors, and acoustic sensors 402. This list is not exhaustive, but illustrative of the type of sensors located on the HMD. The HMD may also house virtual environment (VE) Subsystems such as: (1) high resolution cameras 201, (2) sensors 202, (3) SLAM sensors 203, (4) microphones 204, (5) micro-displays 205, (5) corrective lenses or mirrors with collimators 206, (7) head and eye tracking with eye tracking cameras 207 and IR lights 208 to illuminate the eye for eye tracking for augmenting visual displays; (8) hand and arm tracking for haptic interfaces to control virtual objects and aid in the diagnostic tools 501; (9) body tracking for locomotion and visual displays 101/101a; and/or (10) environment mapping interfaces sensor array 501 to build a digitized geometrical model for interaction with sensors, diagnostics, and simulations 503.

Other sensor technologies which may be housed on the HMD are the digital buttons, which may include the power buttons, and a D-Pad 105 or control-pad for accessing and controlling functions by the user, which may or may not be in a dongle 105; and if not in a dongle then it may exist on the headset or in a wired or wireless remote control. The sensors listed above may include their operating systems and output.

HMD may also house the connectors such as power connection for recharging a battery or for direct connection to an AC source, as well as other connectors for HDMI, sound 401, and other input/outputs, such as additional image overlay display, or for a diagnostics protocol for upgrading the system. The HMD may also house the microprocessor(s) control circuits (MCC), which are described below. The HMD may also contain one or more display per eye, which can be projectors, like Pico projectors, or micro-displays 207. The displays may be used to project though either catoptric system, a dioptric system, or catadioptric system to create an ultra-short-throw image onto reflective lenses, which can be clear plastic, like a polycarbonate resin thermoplastic (Lexan), combined with layers of the Optrx alpha matte subsystem described herein. In this fashion, the display subsystem may consist of a controller with camera input, which may be buffered and then projected by the displays with the corrective lens or lenses, which can be together, or sandwiching around a polarized layer, which may be used to direct the light in a specific fashion. The ultra-short-throw image may then be projected onto the reflective lens made of polycarbonate resin or glass or other see-through moldable material, with the Optrx alpha matte layer included external to the reflective lenses.

The HMD may also include a strap and counterweight or other headgear to balance the HMD and maintain its position on the head. The HMD may contain a "pinch adjustor" to adjust the strap 601. In addition, the HMD may or may not include a "dongle" whereby one or more of the systems or subsystems may be connected via wire or wireless to another device, such as could be worn on a belt or carried in a pocket to reduce the overall weight of the HMD 101a. In one embodiment, the HMD may be connected to another device which is providing power, while in an alternative embodiment, the HMD may have its own power from the mains or from wireless power transmission or from a battery 105.

Further, in another embodiment, the HMD may house other subsystems such as the cameras 502, the microcontrollers, the connectors, central processing unit, graphics processing unit, software, firmware, microphones 206, speakers, display, and collector lens; the displays 207, the Optrx alpha matte subsystem, and other subsystems.

In another embodiment, the HMD may contain a font facing sensor array 501 along with other sensors 502 mentioned above and optical character recognition (OTC) 502 and/or cameras 201 to read and/or measure information from the real world. Additionally, the HMD may contain one or more connectors to connect via wire to the outside world for power and data (i.e. USB, HDMI, MiniUSB) 502.

Alternatively, some parts of the system mentioned herein may be in a dongle attached to the HMD via wire or wireless connection 105. Alternatively, some portions of the system mentioned herein may be contained in a connected device, like a laptop, smart phone, or Wi-Fi router. Alternatively, some parts of the system mentioned herein may be contained in a smartphone or may be transferred back and forth from a smartphone to the HMD, when synced, such as the HMD displaying the smartphone apps and other features of the smartphone that would otherwise be displayed on the smartphone display. Alternatively, the HMD may contain and display all the features that a smartphone can.

In another aspect of the invention, the HMD may contain all the features of a typical smartphone and no connection may be needed with a smartphone to have all the smartphone features, like web or cell calling, app use, SMS, MMS, or similar texting, emailing, logging on to the internet, and the like.

In another aspect of this invention, the HMD headset may provide a computer mediated video shown on the reflective lens layer such that the wearer may see both the real world and the augmented video at the same time. In this aspect of the invention, such features as voice/speech recognition, gesture recognition, obstacle avoidance, an accelerometer, a magnetometer, gyroscope, GPS, special mapping (as used in simultaneous localization and mapping (SLAM)), cellular radio frequencies, Wi-Fi frequencies, Bluetooth and Bluetooth Light connections, infrared cameras, and other light, sound, movement, and temperature sensors may be employed, as well as infrared lighting, eye-tracking, and Optrx alpha matte.

The disclosure particularly describes a system, a method, and technology which may permit the outer layer of the HMD lens, which may be combined with any other layer, to become opaque or diffused or blackened 1002 or a variable gradient of opacity applied 1003 by controlling any number of pixels in the layer to accomplish this feat.

In the case of using liquid crystal technology (LCT), the outer layer may be populated with one or more pixels or sections of pixels so that each pixel in the system can be addressed and either turned on or off or activated to the desired color or transparency/opacity as is desired 1001.

The AR/VR virtual image projection 901 may be enhanced by use of the Optrx alpha matte silhouette image 902 because the Optrx alpha matte may operate to create an occlusion of only the natural or RR "ambient" light related to the virtual image, which may make the virtual image easier to see, especially in an outdoor or bright light environment. The IFO alpha matte occlusion may be 100% 902, or the alpha matte layer may be gradiated so that the IFO is a percentage of the opacity is used 903.

Further, in the instance of turning on all the Optrx alpha matte pixels to form a complete ROI occlusion on one lens 1001, or both lenses 1002, this may make the HMD a virtual reality headset, as none of the RR may be visible in the eye-box or in the periphery of the user or gradiated at any percentage 1003. In this instance, a by-stable cholesteric LCP may be used as in this technology energy may be only used for the change from clear to occluded and vice versa is in the transition, and no energy has to be applied in any of the other steady-states, clear, occluded, or gradiated. In this way, the Oculenz HMD may either be used as an augmented reality device or can be attuned to be a virtual reality device for gamming and other VR uses 1002.

One non-gaming use for total ROI occlusion may be to turn on the Optrx alpha matte to 100%, which fully occludes the glasses and the eyes of the user to the RR world, which may be perfect for a consumer to use while undertaking an activity, such as flying on an airplane as a passenger. In this configuration, the user of the HMD may turn the Optrx alpha matte to 100%, thus occluding anyone from seeing the movie he/she might want to play on the HMD as projected by the displays, like a movie or apps. The Optrx alpha matte system may thus occlude the exterior Optrx alpha matte lenses, making private viewing of apps or an AR/VR image or a movie a private one, which may exclude anyone looking at the user from seeing what they are seeing. In another embodiment, the variable opacity may be controlled with a remote server as well as within the headset. Controlling the alpha matte within the HDM, the user may control the transparency, size, and/or location of the opacity based on a command, as shown in FIG. 12.

The virtual image or alpha matte layer can also be controlled by a server, on-board or remote, where the communication may be initiated by either user input to the server, or a decision made by the algorithms on the server that are taking input from the user to see or not see through to the real world, while also enabling the user to see the projected image.

By varying the level of the opaqueness of the Optrx alpha matte 903, the projected image may be made more visible, especially in high external lighting conditions. Alternately, the Optrx alpha matte may be increased to where the lens has zero or almost zero transparency 102 so that the projected image and the RR are the only things seen. In this instance, with the Optrx alpha matte at 100%, the reflective lens in the headset may go from an AR device to a VR device. Also, the Optrx alpha matte can make the lens virtually transparent whether or not there is any image projected on the lens from the displays or micro-projectors 207.

The Optrx alpha matte subsystem works because the transparent LCP 504 or translucent OLED 701 may contain some resolution of pixels, which in the instance of Optrx alpha matte can be a higher, the same, or a lower resolution than the projected display, and each pixel may be controllable by the Optrx alpha matte controller, which may get its information of which pixels to activate from the display controller. In the Optrx alpha matte layer, activation of the pixels may be turning on the individual RGB pixels in order to achieve the correct level of opacity to compensate for existing brightness for the condition experienced by the user. In this instance, the RGB pixels may be activated to create a "alpha matte" effect or, depending on the type of light, which is extant, an emphasis on either red, green, or blue, or combinations of the three may be used.

In addition, the Optrx alpha matte subsystem can be pre-programmed to provide a user with various options from warm color to cold (amber to green) for a sunglass effect on the exterior of the reflective lens. In the case of the LCP, the activation of the pixels may be one or more phases and changing the polarization of the pixels to achieve opacity on the Optrx alpha matte layer on the exterior of the glasses for the same effect. In this instance, an LCP unit may be employed which may not include an RGB component, as just outside ray blocking is needed.

Alternatively, with Optrx alpha matte, any other transparent material which provides electronic control of pixels or areas inside the transparency to create an opaqueness can be used. In either case, the outer layer may be transparent to the user, providing a "see through" lens to the real world, until some virtual information was displayed on the head mounted display unit reflective lens, such as a hologram, a 2D image like a movie, or other 3D image or information, including text.

Figure 11:
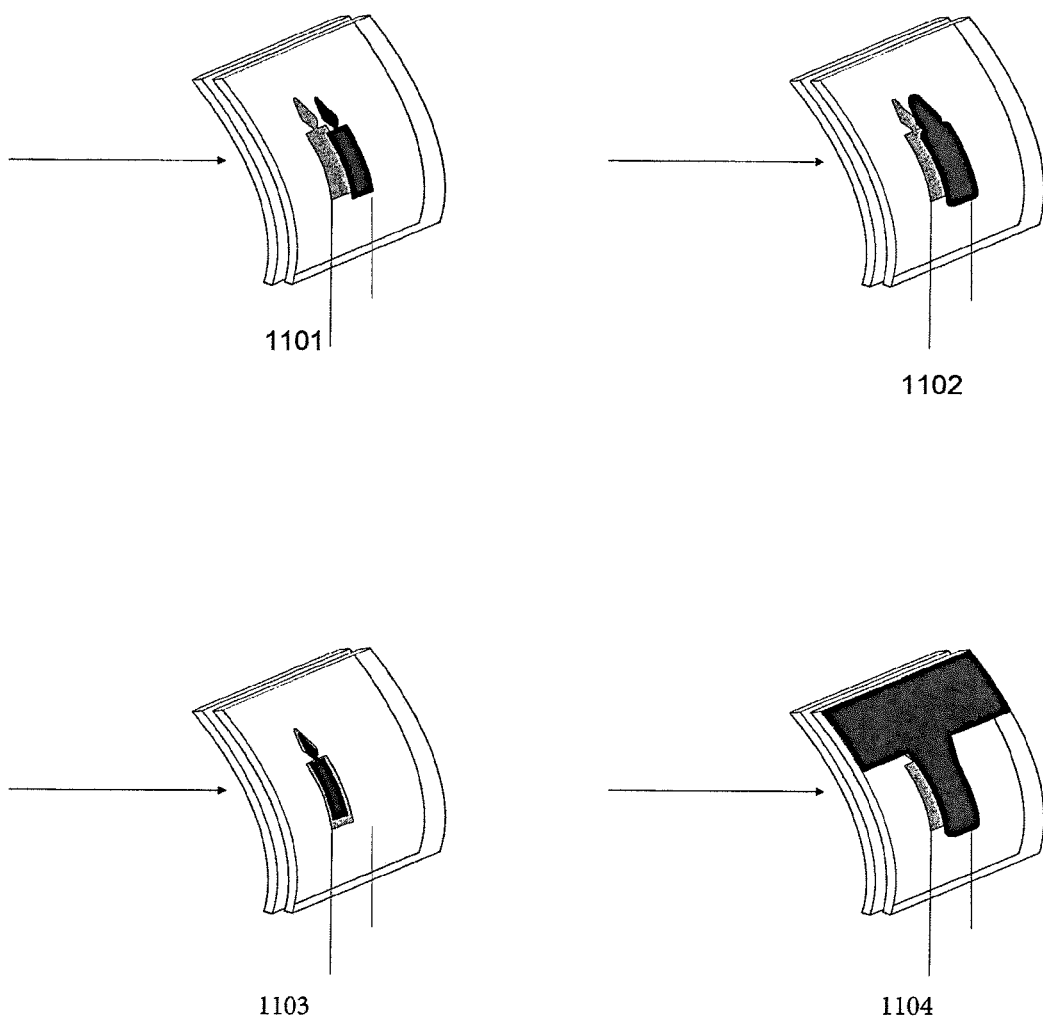
FIG. 11 is a diagrammatic illustration of the region of interest (ROI) dynamic opacity being applied.

Another method of the Optrx alpha matte technology may be to have a 1:1 ratio of pixels for the AR/VR image to the Optrx alpha matte image. In another embodiment of the invention, the pixels of the Optrx alpha matte layer may be less than 1:1, for instance 1:0.5 or 1:0.25 or anything less than 1:1. Likewise, the Optrx alpha matte layer may include pixelization equating to more than 1:1 depending upon application. For instance, it is not always necessary to have the Optrx alpha matte layer the exact number of pixels as the original reflected image, the idea being to create a sufficient enough alpha matte to enhance the original image and reduce the ability of the user to see through the virtually created image to the RR. In other applications, one may desire that the user be able to see through the virtual image and, in that instance, either fewer Optrx alpha matte pixels may be used to alpha matte the original image, or the opacity of the alpha matte pixels may be reduced, and thus, the translucency of the Optrx alpha matte lens may be increased, from, for example, 100% to 50% or less. In other applications, it might be desirable to have a halo or extra shaded area around the virtual image in order to accomplish a desired result, like to emphasize that image or otherwise manipulate it such that the pixelization ratio between the original pixels in the augmented/virtual image is less than that of the Optrx alpha matte layer, as shown in FIG. 11.

In one embodiment of the invention, the MVC may calculate where the streaming AR image will be displayed on the collector lens X1 using the same calculated information sent to the displays which creates the reflected AR image(s). This information, which may be created in the GPU, CPU, or DSP of the headset, may then be relayed in real-time from the AR subsystem to the Optrx alpha matte subsystem, which may then calculate which pixels on the Optrx alpha matte layer to activate so as to create the real-time alpha matte or other occlusion data, as shown in FIG. 9. An alpha matte may be a common term used in photography and filmmaking to combine two or more image elements into a single final image. For example, an alpha matte may be used to combine a foreground image filmed in one setting with a background filmed in a different setting. The alpha matte may be constructed through pixels, either grey scale or full chromatic, on a separate layer, substrate, or plane than the reflected image created by the display's reflection of the AR/VR image on the collector lens. In this patent, "collector lens" or "combiner lens" or "reflective lens" all means the same and together mean the lens upon which the image projected is refracted and reflected into the eye or eye-box. The image created is called herein the "reflected image(s)" or the "reflected layer" or the "AR" image(s), or the "VR" image(s) or the "virtual" image(s) or the "RR" image(s). Eye-box, as used herein, means the area within which the user can place their pupils to experience one or more visuals, partially or wholly.

Figure 10:
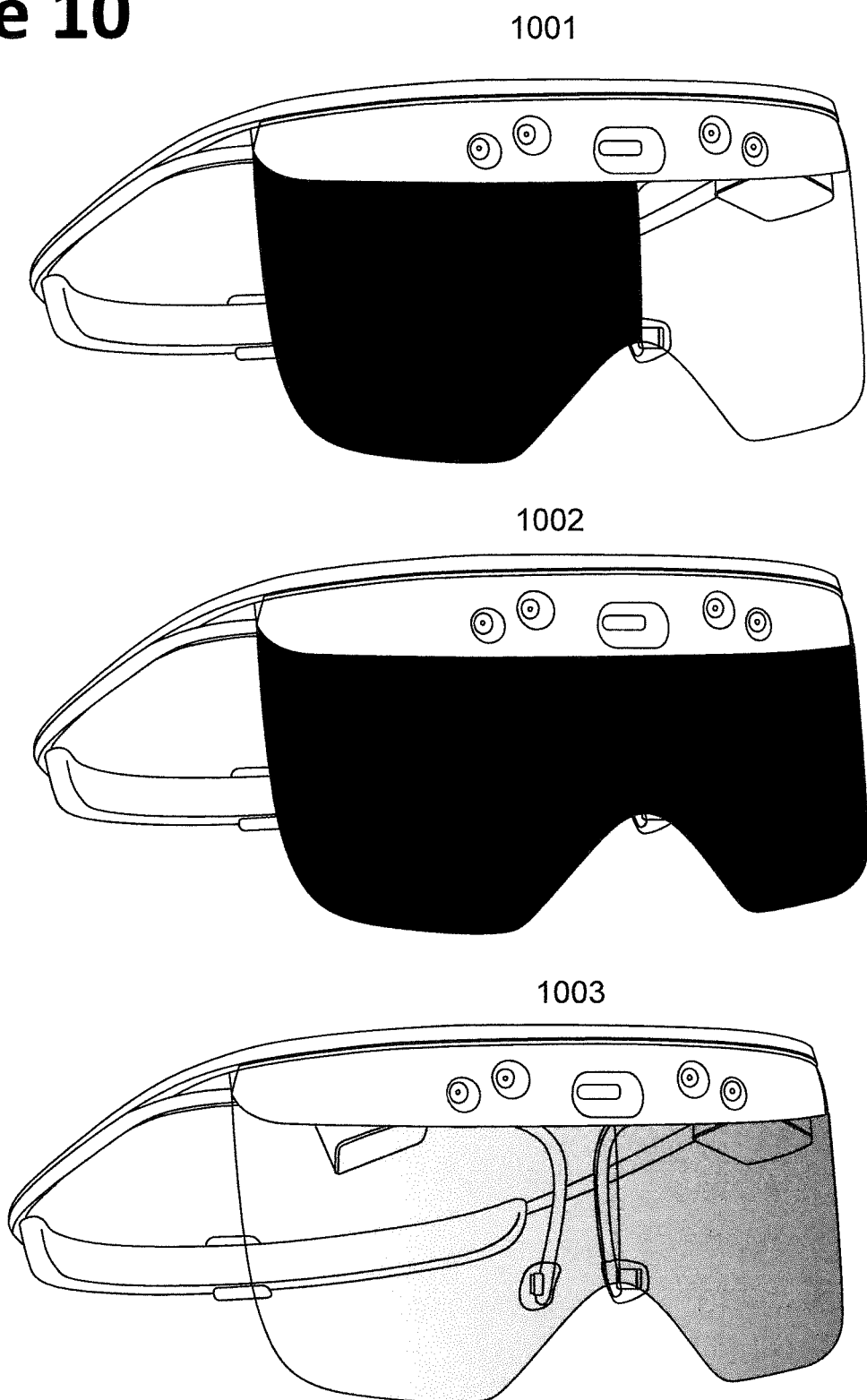
FIG. 10 is a diagrammatic illustration of the HND with its Optrx alpha image field opacity (IFP) composite and its potentials.

In one embodiment of the invention, the Optrx alpha matte layer may be created based upon the exact or near exact location of the reflected image. In another embodiment, the Optrx alpha matte layer pixelization may be created based on criteria other than the exact location of the displayed reflected image(s), for instance in the example of when an entire lens or one side of the lens is to be turned totally opaque, as shown in FIG. 10.

The Optrx alpha matte layer may be created in the MVC and can be programmed under one or more variable modes of operation. In one embodiment, the first variable mode may be called "Image Field Opacity" (IFO), which may be the creation of an "image opacity" mapping which would bear some relationship, as hereinafter described, with reflected or virtual image, i.e. either a 1:1 correlation, or expanded to be larger or shrunk to be smaller but in the same visual region as the reflected or virtual image. In this fashion, the Optrx alpha matte image may be mirrored or silhouetted to the virtual image displayed on the reflective layer. In this preferred embodiment, the second primary variable mode for the Optrx alpha matte layer may be called "Region of Interest" (ROI) mapping, which, in alternative fashion, may have no relationship to the reflected image, and instead may be controlling the lens layer pixels based on other criteria, such as making opaque the entire lens, a portion of the lens, or one side (or half) of the lenses, or creating a gradient through the Optrx alpha matte layer. Thus, this decision tree option may create an "image opacity" that has no relationship to the virtual image but is keyed to some other desire, such as making the layer a sunscreen layer or portions of the layer a sunscreen. The ROI mapping may contain options such as activating all the pixels or dexels in both sides of the lenses in the layer, or, alternatively, all the pixels or dexels in just one side or the other of the lenses in the layer, or both, or the pixels or dexels can be activated in any shape or form, whether or not related to the virtual image, such as gaussian blur, or something like just activating the bottom pixels or dexels in one or both sides of the lenses in the layer. Multiple combinations and options are available, some of which may be preprogrammed into the MVC and some of which can be manually controlled by the HMD user, such as fine tune adjustment for sunscreen or blocking the sun or ambient light on the top or side(s) of the HMD display lens subsystem. In this decision tree choice, the Optrx alpha matte layer may not need, but may have, information about what the virtual image projected is. One can visualize this method by reference to a "green screen" used in the movie industry. The green screen actors would correlate to the virtual image, while the "background" image, whether of a town, building, space, or otherwise, is later merged to form one image. In a similar sense, the ROI mapping plays the part of the "background" in the green screen example, and typically has no direct relationship to the object or image in the foreground.

Image field opacity (IFO) mapping may access the MVC and other software to identify where, on the reflective lens, the virtual display is to be projected, in real or near real time, and transfer that information in a usable format, such as on a x,y grid, so that the pixels within the Optrx alpha matte layer match those pixels/dexels which are being projected onto the reflective layer of the lens. To visualize this feature, one can think of an image and its shadow or silhouette perceived as being projected together, but in reality, each are being created on different planes. Thus, to create an IFO Optrx alpha matte, the CPU, GPU and/or DPS may use the same sources of information used to generate the image sent to the AR display to generate another related image and send that image to the Optrx alpha matte layer. In IFO mode, anything that causes changes in the image sent to the AR display (such as changes in the eye position detected by the eye tracker, changes in the real-world scene viewed by the camera, etc.), may also cause corresponding changes to the opacity of the Optrx alpha matte layer.

IFO mapping can accept input from manual and automatic controls to adjust region outline (RO) scale. Manual controls can be defined as a user input using various methods, and automatic controls can include input from various sensors, such as ambient light sensors, which, in the case of brighter sunlight or ambient light, may automatically cause the Optrx alpha matte layer image to become darker. These inputs may control the correlation of the RO to the virtual image, which may then be sent to the Optrx layer.

IFO mapping can accept input from manual and automatic controls to adjust Optrx opacity levels. The levels can be set from 0% to 100% in some instances. Manual controls can be defined as a user input using various methods, and automatic controls can include input from various sensors, which may provide inputs to control the level of opacity, or color, in the Optrx layer.

ROI mapping can be manually defined regions, or alternating occlusion, such as in the case of treating Amblyopia, or lazy eye, the alpha matte layer can be activated using an oscillator, which can alternate between entire eye regions—left eye transparent/right eye completely opaque, or left eye opaque/right eye completely transparent.

In the case of VR mode, ROI mapping can be used to define the entire Optrx surface as opaque, dark, or some other color, in order to provide a traditional VR environment.

ROI mapping may accept input from manual and automatic controls to adjust region outline (RO) scale. Manual controls may be defined as a user input using various methods, and automatic controls may include input from various sensors. The system may also use these inputs to control the correlation of the RO to the virtual image, which may then be sent to the Optrx layer The method as listed above may take input variables describing the image as it pertains to the particular display device, and it may return a specific uniform location value to enable the device to render the corrected projection to the display device and to the alpha matte layer. It may do all the math to provide the dual matrix, in this case. The method may take input values regarding the field of view of the HMD, which may be different in different models, and the pupillary distance of the user, and may create two sets of x,y coordinates, which may resemble each other, taking into account the exaggeration of the collimator corrected for the virtual image.

The MVC model may take vector (values and numbers) that describe the lens center of the goggle device, as well as field of view of the display, and return the vector object that defines how to display the virtual and alpha matte images together to make it more viewable as a complete image. Of course, the primary reason for the dual image created by the alpha matte layer may be to block some or all of the ambient light, just in the area selected related to the image being displayed so that only the virtual image is blocked to the real world and the rest of the RR is left for viewing by the user. Mapping between image (pixel) coordinates and the alpha matte layer coordinates may be a linear combination of non-linear functions of the image coordinates. This may allow a linear algorithm to estimate nonlinear models and create a method to duplicate the virtual image such that there may be a silhouette formed on the alpha matte layer.

For the purpose of this patent, the processes of getting the light rays to the collector lens may be reflected from an image beamed through a collimator lens, mirror, or other similar device, or may be the lens which reflects into the eye from such technologies as wave guide, beam-splitter, micro LED Quantum-dot technology, mirror or micro-mirror technologies, free-form mirror technologies, birdbath, laser beam scanning display, or prism technologies. The alpha matte panel invented herein can be programmed to operate on either a progressive or interleave methodology, or the alpha matte plane can be created by pixel/subpixel rendering or any other method which activates the alpha matte pixels.

However, to accomplish the requisite video compression and manipulation of both the AR/VR/RR layer (reflected image(s) or layer) and the alpha matte pixels in the Optrx alpha matte layer, the CPU and the GPU may need to be used and functions separated and an ASIC, which is an application specific integrated circuit, or a DSP, which is a digital signal processor, or a field programmable gate array (FPGA) may be used to help combine the necessary CPU and GPU functions. The CPU and the GPU may typically work together, however, to accomplish the task and may need other parts on a circuit or circuit board to fully perform, such as capacitors, resistors, input/output connectors, circuitry, and the like. The correction or fine tuning of the Optrx alpha matte layer may be offered by keystone and other algorithmic corrections contained within or on the HMD as well as the correction for adapting to the projection image of the reflected display.

In another embodiment, the method to displace and replace the information for activating the pixels on the Optrx alpha matte layer may be accomplished with pixel mapping and replacement, which may be accomplished by the model controller. This pixel mapping and replacement may occur after the camera has acquired the image or video and the buffering begins. This manipulation may take place in the central processing unit (CPU) of a micro circuit; and more specifically in the graphics processing unit (GPU), occasionally called the visual processing unit (VPU). These GPU "chips" may be specialized electronic circuits designed to rapidly manipulate and compress/decompress video and alter memory to accelerate the creation of images in a frame buffer intended for output to a display device. Speed may be key here, as any latency may be evident in the display to the eye. With proper software, most of the modern GPU's can be configured to have less than a 1 millisecond delay between acquisition of the image or video, manipulation of the alpha matte pixels, and the display of the AR/RR video, which the eye can easily accommodate and absorb in the display with little or no affect. The system may load the "x, y grid" data from memory and generate a shader based on the input "x, y grid" data. The system may then load the shader into the GPU. In the field of computer graphics, a shader is a computer program that is used to do shading: the production of appropriate levels of light, darkness, and color within an image, or, in the modern era, also to produce special effects do video post-processing.

In this embodiment of the invention, a controller, like a model view controller (MVC), may control the Optrx alpha matte display through corresponding data input information about where the reflective display is projecting information based upon the decision tree, which may start with a decision that the alpha matte layer is going to be IFO or ROI. In this instance, the MVC may identify in the buffer or elsewhere, in digital format, where the images are going to be displayed on the reflective display, and the MCV may anticipate these locations and turn on pixels, including RGB pixels in the transparent LCP or OLED, and "cloud" or rather make more opaque the portions of the lens corresponding to the areas of the lens where the virtual image is being displayed on the inside or other layers of the reflective display. In this fashion, the Optrx alpha matte provides a "backdrop" or "background" display corresponding to the pixels where the virtual image is displayed, making the contrast of the virtual display greater to the eye, so that brightness like natural sunlight can be minimized, which would otherwise compete with the reflected display and cause it to be hard to see. With the Optrx alpha matte, the reflected display may have a buffer between it and exterior light, which may give the reflected display greater brightness to the eye.

The Optrx alpha matte could be in either a coarse or fine mode, meaning that the opacity from the transparent OLED or LCP may either appear in the general area of the virtual display or, for fine applications, may appear in almost or the exact same pixels which correspond to the image pixels being displayed or reflected on the interior of the lens. In another aspect of the invention, the Optrx alpha matte may work with wave guide displays or prism type displays with equal effect. Likewise, the Optrx alpha matte described here may be used with a micro-mirror type display with equal effect.

There are many methods to identify exactly where the coarse or fine opaqueness should appear, but one embodiment may use the same eye-tracking as the primary display/lens and the MVC may know exactly where the eye gaze is and how far each way on a six way axis the virtual display is centered and extends, so that the opaqueness mimics the same space as the virtual display according to where the eyes are gazing as identified by the eye-tracking software. In this way, the reflected image display may overcome the issue of not being bright enough in daylight and other high light conditions. Likewise, the Optrx alpha matte may include a transparent OLED or LCP overlay or layer of the lens that can also act as "sunglasses" for the display and "tint" the entire display to compensate for bright lights, like on a sunny day. Alternately, with similar effect, a light valve can be used with the same effect in a similar manner. A light valve (LV) is a known device for varying the quantity of light from a source that reaches a target. Examples of targets are computer screen surfaces, or a wall screen, or in this case the coarse or fine coverage of the virtual display on the glasses lens.

In another aspect of the invention, the real world is not displayed, but may be all blocked out by the Optrx alpha matte and only videos, television shows, emails, or other online or prepackaged information may be displayed, either with or without macular degeneration type pixel manipulation, so that a user may experience other forms of entertainment, training, learning, or task accomplishment with the mixed reality HMD or glasses than just a real world projection onto the display. The HMD can also be fitted with night-vision, infrared, or other types of cameras so that the experience is hyper real world. Thus, any kind of camera can be used to make a display, In the Optrx alpha matte technology, the model controller can be used to pre-programmed or programmed the system to automatically compensate for external brightness and act as instant "transition" lenses and can be either used on the AR glasses display or, with computer intelligence, can be used on typical corrective lenses. In this case, the entire exterior layer of transparent OLED or LCP, in this instance, may tint much like a light valve to balance the bright external light, and may still provide additional opaqueness on the portion of the lens where the virtual video or picture or image is being displayed. Alternately, the light valve can be used to complete black out the reflected image lens so that the augmented reality aspect becomes a virtual reality aspect blocking all real-world information and only displaying information from the displays onto the reflective lens.

Further, this patent teaches that both the display layer (on the collector lens or reflective lens) and the Optrx alpha matte layer can be run by use of "shaders," which may calculate the rendering effects on graphics hardware with a high degree of flexibility. Most shaders are coded for a graphics processing unit (GPU), though this is not a strict requirement. Shading languages are usually used to program the programmable GPU rendering pipeline, which has mostly superseded the fixed-function pipeline that allowed only common geometry transformation and pixel-shading functions. However, with shaders, customized effects can be used which, in the instance of Optrx alpha matte, can mirror on its layer, in monochrome or full chromatic, the augmented reality image projected by the HMD. The position, hue, saturation, brightness, and contrast of all pixels, vertices, or textures used to construct a final image can be altered on the fly, using algorithms defined in the shader, and can be modified by external variables or textures introduced by the program calling the shader programming.

In an alternative version of the invention, the Optrx alpha matte subsystem may be controlled by the display controller and may work in tandem with the information displayed. The display controller may create an image buffer for the projected virtual display, and this information may be shared with the Optrx alpha matte controller, which may then activate the pixels corresponding with the exact or near exact location where the display controller is projecting the virtual image, so as to make the portion of the reflective lens upon which the image display is being projected likewise made opaque on the exterior of the reflective lens, so that the image displayed appears to be brighter due to the backlighting or light filtering provided by the Optrx alpha matte.

In another embodiment, the variable opacity can be controlled a Bluetooth or other wireless controller. In this scenario, the user may control the transparency, size, and/or location of the opacity based on input from a wireless controller. The controller could use any number of wireless protocols to communicate with the HMD. Some protocols that could be used include Bluetooth, BLE, IrDA, RC-5, ZigBee, xbee (IEEE 802.15.4), or any method described in IEEE 802.15, Wi-Fi (2.4 ghz or 5.8 ghz IEEE 802.11b/g/n/ac), WiGig (IEEE 802.1 lad). The controller could utilize mechanical buttons, capacitive inputs, and/or IMU (inertial measurement units containing between 1Dof and 12Dof). Parts in an inertial measurement unit can include any, all, and/or multiples of gyroscope(s), accelerometer(s), and magnetometer(s) data.

In another embodiment, the variable opacity may be controlled by a wired controller. In this scenario, the user may control the transparency, size, and/or location of the opacity based on input from a wired controller. The controller could utilize mechanical buttons, capacitive inputs, and/or IMU (inertial measurement units containing between 1Dof and 12Dof). Parts in an inertial measurement unit can include any, all, and/or multiples of gyroscope(s), accelerometer(s), and magnetometer(s).

In one embodiment, the variable opacity may be controlled by voice control. In this scenario, the user may control the transparency, size, and/or location of the opacity based on a user's voice input. The voice command may be captured by the system either continuously or after an activation word (i.e. Alexa, hey google, etc.) and processed through speech recognition technologies.

In one embodiment, the variable opacity can be controlled with gestures. In this scenario, the user may control the transparency, size, and/or location of the opacity based on a user gesture. These gestures could be interpreted by the system through the use of gesture recognition cameras (algorithms to detect gestures based on a camera input), IMU data (algorithms to detect gestures using inertial measurement units containing between 1Dof and 12Dof). Parts in an inertial measurement unit can include any, all, and/or multiples of: gyroscope(s), accelerometer(s), and magnetometer(s) and the like.

In one embodiment, the variable opacity may be controlled by head tilt or body motion control input.

In another embodiment of the invention, a blur or "dynamic diffusion" can be created to cause a blur in a selected region or the whole lens, but let the light through a specified portion or pixels, as opposed to aforementioned OPTRX alpha matte that blocks light in a selected region.

The system may support various opacity modes such as: on/off; gradient; left/right; side; top, bottom; alpha matte; glow; ambient light response; or other modes and the other expressions of operation as identified herein.

In one embodiment, the Optrx alpha matte may provide variable opacity, which may be controlled by location data. In another embodiment, the Optrx alpha matte may be controlled with an ambient light sensor. In another embodiment, the variable opacity may be controlled to correspond with the image displayed on the main display. In another embodiment, the Optrx alpha matte, which may also provide variable opacity, may be controlled by the eye tracking. In another embodiment, the Optrx alpha matte may switch between blocking one eye and blocking the other eye, controlled by an oscillator in the headset ("alternating occlusion training").

In another embodiment, a simple reduction of the image may occur on the Optrx alpha matte layer. This is useful because a part of the image or video may need to be "cut out" in software and repositioned on the next adjacent space to a deficit in the eye.

It must be remembered that the entire retina, except in the case of disease such as macular degeneration, is the light and color sensitive tissue that lines the inside of the eye. As such, the retina functions in a manner similar to film in a camera, hence this invention supplements the retina's camera effect by providing an augmented, mixed reality duality of vision to the HMD user using both external camera(s) and display(s) of AR/VR images, as well as the eye's natural vision of the RR. Because it is important to make the augmented video or image hit as many cones as possible along with RR, the higher the rate of resolution, the better, while the resolution of the Optrx alpha matte layer may but does not have to match that of the AR/VR image(s).

Thus, in one aspect of the invention, the image to be displayed may cover over the entire 220 degrees of normal eye vision, and the Optrx alpha matte layer may be approximately the same FOV, while in another aspect of the invention, the image may be displayed on 90 degrees, 80 degrees, or 50 degrees or less FOV, and the Optrx alpha matte layer may either be greater or less than that of the AR/R FOV image projection area.

The alpha matte image to be displayed on the Optrx alpha matte layer may be intended to be displayed on all or a portion of the lenses of mixed reality HMD, goggles, or other display techniques, where exists both video (augmented reality [AR]) and normal RR vision. In another embodiment of the invention, the RR layer may be tinted or pigmented by the Optrx alpha matte layer. This can be electronically controlled, or a chemical technology such as photochromatic technology, as stated above.

Part of the duality of the vision is the RR that the HMD user may adequately see where there is no augmented modified video, typically on the periphery of the lenses of the glasses and beyond that, simply the user's own unrestricted vision.

In its natural state, the optical elements in the eye focus an image onto the retina of the eye, using the lens, initiating a series of chemical and electrical events within the retina. Nerve fibers within the retina receive these signals and send electrical signals to the brain, which may then interpret these signals as visual images. Thus, by shading the AR/VR image with Optrx alpha matte, the retina may see the augmented reality (AR/VR) image better than the RR and thus that image may be superimposed upon the retina and exceed the RR version of the view.

It can be recognized that in many instances, since the area of AR/VR projected image may not be expressed in a standard form, like an oval or circle, that there must also be algorithms which constantly and instantly measure how where on the x,y grid a pixel would have to be turned on in the LCP layer versus the original AR/VR reflected display area (in which the original pixel(s) resides) to immolate the original AR/VR image. Thus, measurements may be taken from the area of the streaming AR/VR projected image, in real-time, either with or without the scotoma marker buffering, in order to determine which way to activate the Optrx alpha matte pixels on the x,y grid, either up, down, to the left or right sideways, or transversely, such as up and left or down and right, to match more or less that of the original image pixels being projected upon the HMD lens. Thus, two pixels or parts of an image which were originally exactly adjacent to one another on any axis up/down, sideways, or transverse, may be activated together one way, or, if one pixel or part of an image is closer to one border than to the other, the pixels are to be split with one pixel or image going to its closest border and the other pixel going to its closest border, which may be the essence of corrective subpixel mapping and modification.

In the instance of use of Oculenz Optrx alpha matte for advanced macular degeneration (AMD) and other eye disease patients, the cutting of the "hole" and repositioning of the streaming video or image may be accomplished primarily by stretching the pixels to a larger overall area than the original captured image (i.e. 100° stretches to 120° overall space, but the center 10° may be cut out and then the edge image is compressed such that the final image is still 100°). As is noted, the outer edges of the virtual image, as it reaches the boundary of the RR, may be compressed so that the final image does not exceed the original space of the original RR image being projected. Likewise, that of the Optrx alpha matte layer may stay in the same x, y pathways so that maximum peripheral RR vision is always accomplished. In this method, all the pixels are still there, in relatively the same size and shape, as originally captured and buffered by the camera(s), except either the far edge boundary has been extended or compressed. Likewise, the Optrx alpha matte layer may use the same "hole," "buffer," or "mapped scotoma" area to display the alpha matte of the image being manipulated as well as shading the "hole" or "scotoma marker" which is cut out. This method may use buffering of the image and pixel mapping, interpolation, and synthesis to achieve both the buffered image (which may be created using the Oculenz self-calibration mode, which may edge-detect and map the analog defect in the eye and position it according to how the digital HMD is worn to create the desired effect). Under this method, the pixels in the area of the display to be avoided may be mapped, in real or near real time, within or without a buffer, and software algorithms may keep the same shape of the image, but reduce the size of the pixels to address where both the RR modified image, as well as the Optrx alpha matte pixels, are to be displayed.

In the instance of an alpha matte image of less than 1:1 pixels on the original image vs. the Optrx alpha matte image, the use of subpixels may be applicable, such an image which was, for instance, shown on four pixels is now shown on three, two, or just one. The resulting display may have all the image, just on a fewer number of pixels and subpixels. Pixels as used herein are perceived spaces where subpixel mapping is a recently developed technology involving algorithms to obtain and map the spatial distribution information of area covered within mixed pixels and then reposition them on a smaller or different scale. Algorithms can be applied to pixel mapped video or image content and moved images from one location in the video to another and the shape to be avoided may have edges and otherwise not be a homogenous shape like a circle or oval. In some instances, the pixels or subpixels must be "distorted" in order to have more than 100% of the image included into 100% of the display space. In this case, the pixels or image may take on a shape which is not a typical pixel square, but can be something besides a square, and often more like a tetrahedron or polyhedron, or shapes like triangles or parallelograms.

Under this method, the classification on a per pixel basis may be established and then reconstituted in a pixel/subpixel format to achieve subpixel mapping for modification, which may be recognized by the buffering to display software and also by the Optrx alpha matte software. By applying known pixel and subpixel mapping techniques, as well as the ones invented by the inventors here, an image or video can be displayed with augmented pixel/subpixel manipulation and stitching so that a whole image exists, just not in the original place as the camera input originally assigned.

The invention also includes a method to store the Optrx alpha matte pixel model in the database and to project it on a display.

The invention also includes a using Optrx alpha matte to enhance the diagnostic impairment mapping (DIM) or self-calibration system and method to capture information about the area and location of the eye containing a defect, as in mapping the area where macular degeneration has occurred and little or no sight or vision remains. Using various gradients of the Optrx alpha matte during visual field testing of a macular degeneration patient, the model controller can randomly or be programmed to give the patient different amounts of light, gradient, or obfuscation so that it is possible to better determine the areas of relative scotoma from the areas of an absolute scotoma.

Shaders, which are also used widely in cinema postprocessing, computer-generated imagery, and video games to produce a seemingly infinite range of effects, can be used in creating both the augmented reality image and the Optrx alpha matte image that it mirrors, primarily in monochrome (opaque, dark, or diffuse/non-diffuse). Beyond just simple lighting models, more complex uses include altering the hue, saturation, brightness, or contrast of an image, producing blur, light bloom, volumetric lighting, normal mapping for depth effects, bokeh, cel shading, posterization, bump mapping, distortion, chroma keying (so-called "bluescreen/ greenscreen" effects), as well as diffusion/non-diffusion, edge detection and motion detection, psychedelic effects, and a wide range of other.

In another aspect of the present invention, the model controller may establish a plurality of Optrx alpha matte x, y maps that vary in any of the parameters mentioned herein and may be used to generate the streaming Optrx alpha matte pixeling.

Each eye of the patient may be different and may have a unique defect. For instance, one eye of the patient may have a specific defect (having a specific shape, size, and location), while the other eye of the patient may not have a defect or may have a defect having a different shape and size. Thus, each eye of the patient may be mapped and a respective visual model of each eye may be established. Likewise, a border of the defect of each eye may be generated and an associated Optrx alpha matte map generated. In one embodiment, separate cameras may generate a separate set of images for each eye and the display controller may generate a respective series of images to be presented to each eye on the Optrx alpha matte layer.

The Optrx alpha matte boundary may be established as a function of the values associated with the cells in the x, y grid. In one embodiment, the values in the grid values may be compared with a threshold in the original AR/VR image projection to establish the boundary. Alternatively, the FOV data 26 may be used to create a contour. The visual model may emerge from interpreting the raw data and may not necessarily be a point-by-point transformation of the raw data. The intent may be to put the removed pixels as close to where they ordinarily would have been, and thus the algorithms in the software may determine, based on (i) the whole of the defect, (ii) the distance of the specific pixel or ray from the border of the defect, (iii) whether a pixel is a new image or a part of an existing image (meaning whether the pixel is a part of an image or on the border of an image change), (iv) the other options for the pixel to move another way, and (v) where the adjacent pixels to be adjusted are being moved, exactly where to move such pixels/rays.

In another embodiment of the invention, vector images may be used to create the Optrx alpha matte image with pixels. For the purpose of this patent, vector images and pixels are used interchangeably. However, in practice, unlike digital images which are made up of (usually) millions of tiny squares or other shapes known as pixels, vector images are made from mathematical points connected together by lines and curves to create different shapes. Since they are based on math and algorithms, not merely pre-placed pixels, vector shapes are extremely flexible and Optrx alpha matte does not suffer from the same limitations as pixels.

Tracking systems like RFID, Wi-Fi, or cellular tracking location based directional travel can control the Optrx alpha matte layer by, for instance, turning on the Optrx alpha matte shading when a person exits a building.

Other communication systems can also be included based on either wire or wireless connectivity of the HMD. The HMD can also be connected wired or wirelessly to a main monitoring data system which would track the health, whereabouts, and condition of the user to be displayed to another person, such as a caretaker or a health care provider.

One aspect of the Optrx alpha matte invention may solve the typical "heads-up" reflected display problem of visualization in bright light or sunlight conditions. In this instance, the HMD may use a bright display, such as, for the highest resolution, a Quad HD AMOLED display, which may be reflected onto the surface of a lens for the user to see the virtual portion of the display. In using a high-NIT and high-resolution AMOLED reflected display, the brightness may be adjusted up or down depending on ambient light. Alternatively, the adjustment may be in the system controller and automatically adjust depending on what the sensors say the brightness of the ambient light is, which would typically be brighter when in brighter exterior light.

The Optrx alpha matte layer may exist in one or more layers to gain added effect; for instance, one Optrx alpha matte layer might provide shading with an opaqueness or darkness, while at the same time a mirror image of that layer, or some non-mirror image of that layer, might turn on color pixels to create a more bold effect.

In one aspect of the invention, a reflective coating may be applied to the clear lens to enhance the reflectivity of the virtually displayed image. In another aspect of the invention, the reflective coating may not be necessary because of the operation of the Optrx alpha matte subsystem.

The clear lens upon which the high-resolution display, which may be a plastic like Lexan, or other clear polycarbonate, or glass or any other clear material, may or may not have a reflector integrated into the lens to improve visibility of the reflected display. In any case, the outside of the lens may also be bonded to a layer containing a liquid crystal display (LCP) or transparent OLED display, which may operate to obscure the outside light to provide greater acuity for the wearer viewing the virtual information displayed in high lighting conditions (OPTRX alpha matte display or dynamic opacity display (DOD)). An OLED transparent display can be quite clear, which may make reading fine details or text on objects behind the display possible until something is displayed on the screen in "virtual mode," meaning something from the streaming video reflected display is shown on the display/lens. Alternatively, a transparent/translucent LCP can be used as an outer layer or middle layer of the otherwise clear lenses and bonded together with the clear lens upon which the reflected display is to be projected to create the Optrx alpha matte. Optrx alpha matte may sense where the image is being projected on the interior of the lens and may obscure from one percent or less to up to 100 percent of the otherwise clear lens. In this aspect, the clear lens may or may not be also coated with a reflective layer to increase reflectivity on the projected image, such that the base lens is not exactly clear, but is some percentage obscured by the reflective film, paint, or other embedded reflectivity.

The HMD may include an eye-tracking subsystem, which may work through hardware and software. The software may be connected to the system's GPU working in connection with the systems model controller. The eye-tracking may be captured by infrared (IR) light being projected onto the eye, which may create a glint or reflection, which may then be captured by an IR sensitive camera. Typically, an eye-tracking system captures the glint from the eye from 30 frames per second to 500 frames per second. This information may be stored in real-time in the model controller, which can be an MVC, and then may process this information into a virtual space represented by x, y or Cartesian coordinates. These coordinates may provide the system with the information about where the user's gaze is in relation to the reflective lens and the Optrx alpha matte layer so that both stay aligned with the user's gaze.

When used for medical applications, like advanced macular degeneration (AMD), the eye-tracking information may be correlated with the buffered information about the person's eye visual defect such that when the manipulated image is displayed and the Optrx alpha matte is used with that manipulated image, both layers (AR/VR reflected layer and the Optrx alpha matte layer) are in sync with the user's gaze and the dynamic opacity alpha matte layer is opaque over the manipulated area so that the virtual image is better perceived by the user than the RR behind it. This may be necessary because the eye scanning and eye movement may necessitate that the buffered and manipulated area of the video be moved to correspond to the user's eye gaze so that the buffered "hole" in the original image (AR/VR) and the Optrx alpha matte image obscuring the RR behind the "hole" and the user's defect align and remain in sync. All this processing may happen in real-time and may keep up with the movement of the user's eye. Latency may be important and keeping the latency to less than 10 to 20 milliseconds may aid in preventing the user from feeling dizzy and preventing whirr.

This invention may provide an either an AR experience such as geolocation gaming, or a favorite VR immersive experience, as the Optrx alpha matte can change the lens from see-through to obscured and/or opaque with a simple virtual touch or voice command or hand gesture. Alternately, the Optrx alpha matte pixels/dexels may be activated by the use of the Automatic Light-Adaptive Scaler™ (ALAS™) so that, for instance, Optrx lens may change to block sunlight and to deepen a gamer's experience.

In another embodiment, multiple display panels (image generators) may be placed for each eye, using a catoptric, dioptric, or catadioptric system to combine into a larger effective image.

In another embodiment, the system may arrange multiple display panels and their associated catoptric or catadioptric systems radially around the eyeball, rather than "in front of" the eyeball, making it easier for the image to cover a wide field of view in the far-left periphery and far right periphery of each eye.

In one embodiment, the optics may make multiple display panels appear to the eye to be optically overlapping, so even when normal mechanical tolerances during assembly place each display panel slightly left or right of the nominal position, software similar to standard "multi-projector display" "projection mapping" "video mapping" remapping software may find out exactly how much they actually overlap on each individual headset and re-align the image in software to create one large effective display per eye.

In one embodiment, the region of the overall effective virtual display generated by each physical display may have a constant resolution, which is to say the resolution of the virtual display may be a 1:1 enlargement of the combination of the individual physical displays.

In one embodiment, the catoptric, dioptric, or catadioptric system may be designed such that the region of the overall effective virtual display generated by the physical display may have variable resolution, with higher resolution in the region near the center of vision, and lower resolution in the periphery, which is to say that the virtual display may have a higher density of the pixels from the combined physical displays in the HAR, and a lower density of pixels from the combined physical displays toward the outer bounds of the virtual display.

In one embodiment, the variable resolution may be linear. In this embodiment, the distribution of the physical pixels to the virtual display may be dissipated in a more or less linear fashion after the High Acuity Region (HAR) is established, such as the linear function f(x)=mx+b where m is not equal to 0.

In one embodiment, the variable resolution may not be linear. In this embodiment, the distribution of the physical pixels to the virtual display may be dissipated in a non-linear fashion after the HAR region is established, such as a cubic Bezier curve In one embodiment, the catoptric, dioptric, or catadioptric system may be manufactured as a single unit. This manufacturing process can make alignment easier to achieve.

In one embodiment, the catadioptric, dioptric, or catadioptric system may be manufactured in several sections. This manufacturing process can provide the ability to utilize more complex design for the overall HMD. While not necessarily reducing cost, a multiple unit production could lend itself to more ergonomic HMD designs.

FIG. 13 is a diagrammatic illustration of a Low-High-Low (LHL) optical engine design of how multiple displays can be used, mixing one high resolution with two lower resolution displays outboard to create an extremely high resolution in the eye-box. Arranging multiple display panels 1301, 1302L, and 1302R and their associated catoptric, dioptric, or catadioptric systems radially may "surround" the eyeball, rather than be "in front of" the eyeball, which may make it easier for the image to cover a wide field-of-view in the far left periphery and far right periphery of each eye. The subject eye 1304 may be the focal point of the system, and the approximate center for the rotation of the eye. The eye-box 1305 may represent the high acuity range where it is desirable to have the highest resolution and high acuity, i.e., 60 pixels per degree resolution, more or less, although this area is not definitive or limiting of the HAR range design. As a one to one optics system, it may translate the resolution of the physical display to proportional resolution at the eye with the low acuity range 1306 on either side of the high acuity range.

The high-resolution display 1301 in this instance may have about two million pixels per display and may be paired with two outer displays 1302L and 1302R, which may have approximately one million pixels each and may be used together to create a virtual 4K display when the pixels are combined from the displays 1305 plus 1306L and 1306R displays through the optical system 1303. In this fashion, the combination of display can be used to achieve a high field of view (FOV), such as 120 degrees, creating a higher pixel density in the central region of sight, like in the high acuity region 1305 and the eye-box 1306 of the HMD, at up to 60 pixels per degree, or more, at up to 20 degrees FOV, while keeping the peripheral vision at a 20 pixels density sufficient to maintain accurate vision for the periphery of each eye in line with the RR dynamics. Of course, the higher the pixel per degree, the less the FOV. A diagrammatic illustration is provided of the 1:1 resolution 1303 to show that every pixel of each display may correspond with a pixel on the virtual image in a one to one ratio.

FIG. 13a shows the same optical engine with a pixelization ratio of 1:1 with the displays arranged radially around the eye instead of linearly, so that all of the optics of one section are identical to the optics of the other displays, making the manufacturing of the displays easier.

A 1:1 magnification ratio 1303, using catoptric, dioptric, or catadioptric optics, can be used. In this embodiment, the control of the effective pixel density of the virtual image may control the density of the pixels on the physical displays. In this embodiment, the magnification of each display may be equal, but it may not have to be equal, and in fact unequal ratios may be preferred.

Figure 14:
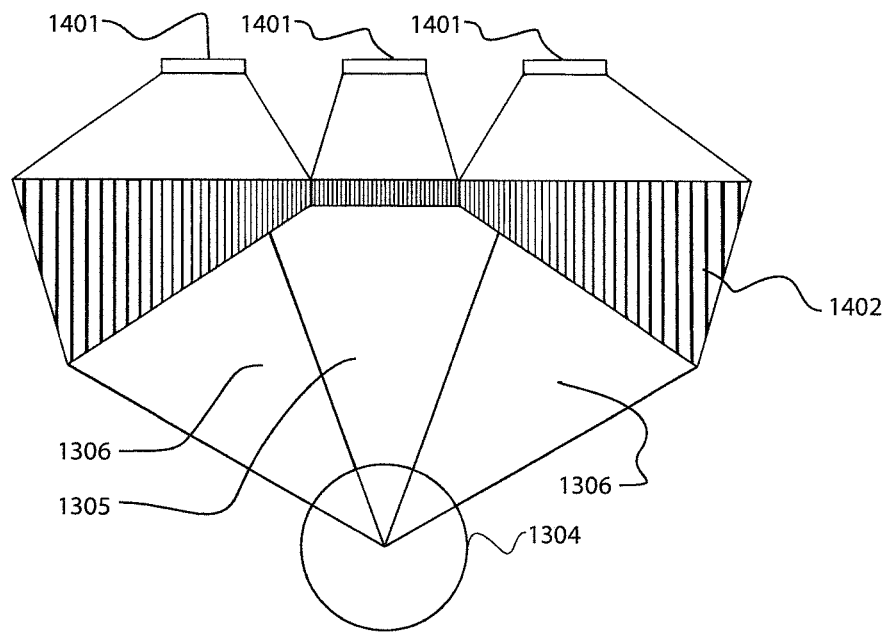
FIG. 14 is a diagrammatic illustration of a high-high-high (HHH) optical engine with multiple displays, where one or more displays have equal pixel density and contains one or more corrective lenses and collimators.

FIG. 14 shows the high-resolution display 1401, in this instance, with about 2 million pixels per display paired with two outer displays 1402L and 1402R, which may have the same or similar resolution called a high-high-high (HHH) optical engine, where each display 1401 is equal in resolution, type, and size. The optics in this configuration 1402 may not have a 1:1 correlation with the pixel on the virtual image 1413. While in FIG. 13, the display pixels and the virtual image pixel are paired 1:1 ratio, in this instant configuration there is one optical system per display with no overlap and the ratio is not 1:1 1413. Also, in this configuration the center display may have a high pixel density on the virtual image while the exterior displays may project a lesser pixel density on the virtual image. This may create a situation where the center of the eye-box has a very high pixel density, where most of the human eye's acuity is, while less pixel density is on the periphery of the FOV. This, then matches the operation of the natural human eye, were most of the rods and cones are situated in the macula, the fovea i.e. the virtual center of the eye, and thus mirroring (retina mirroring display [RMD]) the acuity of the human eye with the HMD virtual image. Also, the middle display may be entirely a constant high resolution. The next display over may start out at a constant high-resolution, then further towards the periphery of the visual field change to lower resolution.

Figure 14A:
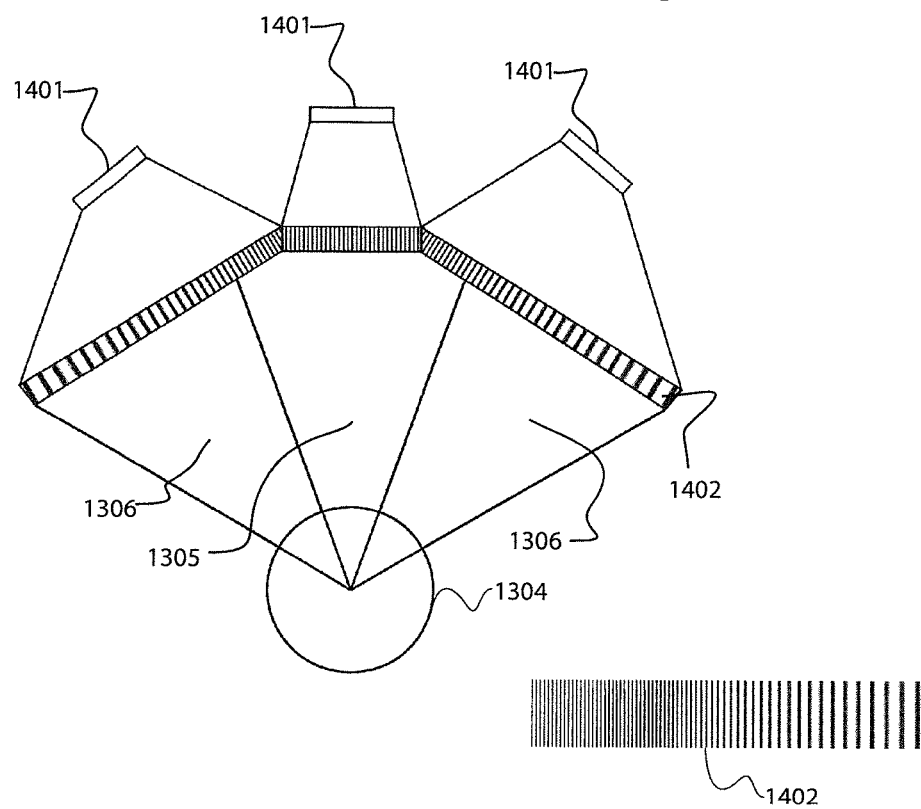
FIG. 14a is a diagrammatic illustration of the same configuration except that the displays are situated radially around the eye.

The optical diagram FIG. 14a is the same as the optical diagram FIG. 14 except aligning the displays radially around the eye instead of linearly. This may make the optical design more cost effective and better fitting into an HMD. The arrangement may have the advantage that all of the optics (lenses and mirrors) of one section are identical for all three sections so the manufacturer can just stamp out the optics three times per eye, six times per headset. The legend 1402 shows that there is not a 1:1 ratio between the projected display pixels and the virtual image pixels.

All of FIGS. 13, 13a, 14, and 14a show a diagrammatic view of the re-mapping done by the catoptric, dioptric, or catadioptric system, using optics to disperse pixels. The pixel dispersion may be done by the surface shape of the optical elements—the catoptric, dioptric, or catadioptric systems. In this embodiment, the physical displays may have fixed resolution; but the apparent resolution may vary in the virtual image. This variable resolution distribution can be either linear or nonlinear resolution distribution. The left and right optical systems can be manufactured identically and flipped horizontally for installation. This makes them easier to mass produce. This also makes it easier to repair—if any section is damaged, to repair it, the manufacturer or repairer only has to stock two kinds of optics, simplifying the supply chain.

Figure 15:
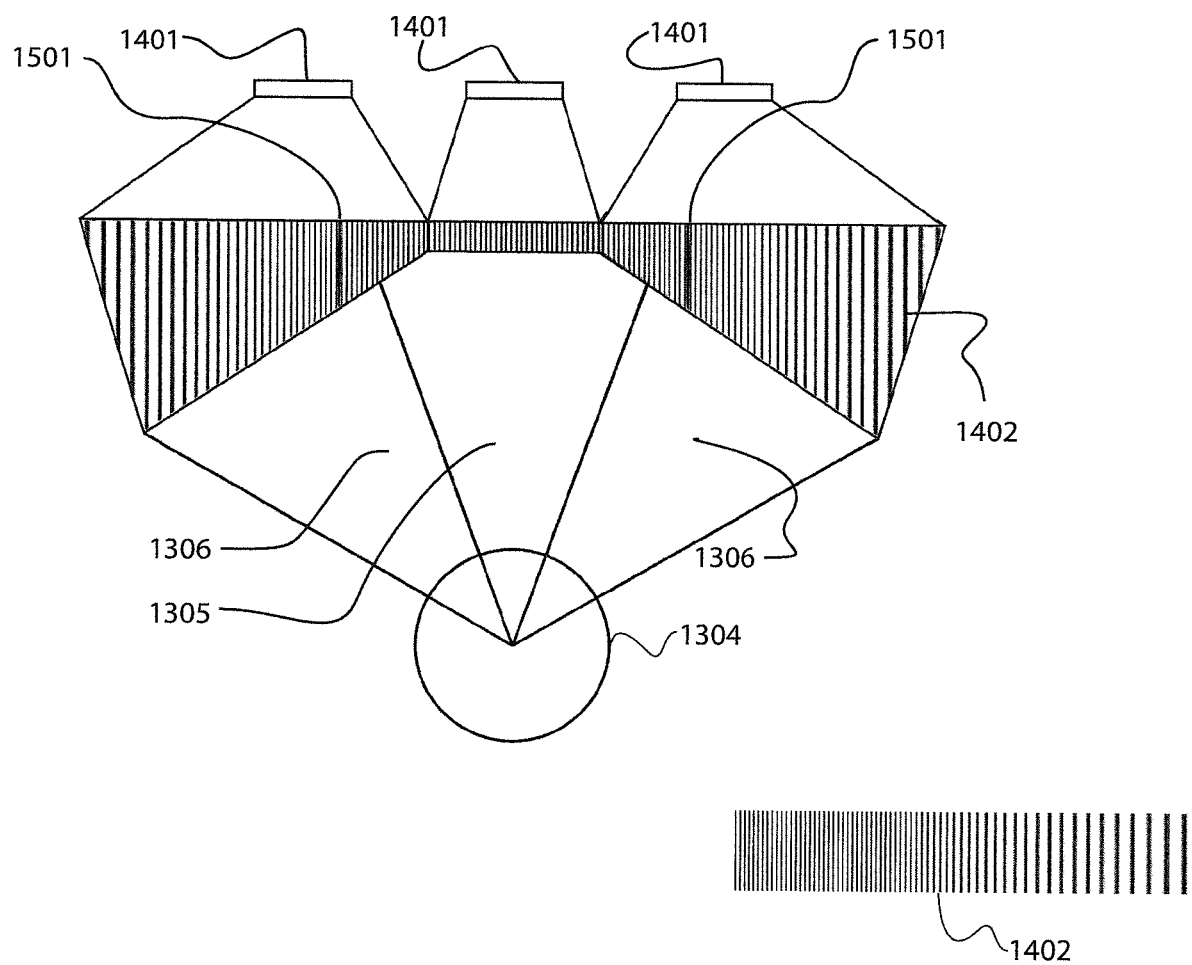
FIG. 15 is a diagrammatic illustration of a HHH optical engine where the projected boundaries of the displays overlap on the reflected lens, such that there is a concentration of pixels in the eye-box higher than capable of any one of the displays alone, creating a very high pixel density in the eye-box, with the corresponding lesser pixel density in the periphery of the virtual/reflected image.

FIG. 15 is a diagrammatic illustration of an optical engine 1501 where the boundaries of the projected images from the multiple displays overlap where the optical systems merge or overlap, creating higher density of pixels in the virtual image. In this fashion, some pixels from both the left and right displays may be used to augment the pixels in the center display to create a higher pixel density in the eye-box.

In this embodiment, the large effective virtual image may have high resolution, ideally 60 pixels per degree, which may be the theoretical maximum resolution the human eye can resolve with 20/20 vision, in the center of the eye box, also called the HAR, and lower resolution in the periphery (because the human eye has much lower resolution in the periphery). It is uncomfortable to strain the eyes to the outer limits of FOV, but more natural to move the head when reaching the outer limits of FOV, and this fact illustrates the benefit of keeping the high acuity region in the central region, while leaving the outer regions of the FOV with lower resolution just as the eye has lower resolution in its periphery. By using more or less the same catoptric, dioptric, or catadioptric systems and multiple displays of more or less the outer size, each display may cover the field of view by using lower resolution (larger pixel pitch) displays in the periphery. In this way, a large effective image that has high resolution may be created in the eye-box, ideally 60 pixels per degree, which is the theoretical maximum resolution the human eye can resolve with 20/20 vision, in the center of the eye box and lower resolution in the periphery (because the human eye has much lower resolution in the periphery) with more or less the same resolution (same pixel pitch) displays, by using catoptric, dioptric, or catadioptric system that remaps the displays in the periphery to cover a wider field of view than the display(s) in the center.

Thus, in one embodiment of the invention, the projected boundaries 1501 may optically overlap but can physically have a gap in it, such that there can or cannot be a physical distance between the displays, and there could be a physical distance between the optical elements, the virtual image would slightly overlap.

As for any of the displays mentioned in this disclosure, each could be an OLED, micro-LED, LCOS, LCD, quantum-dot, quantum-dot-on-micro-LED, direct retinal laser, semi-coherent LEDs (near-coherent LEDs), quantum-dot array, or other micro display technology that may be developed. The lower-resolution micro-displays could be any of the same display technologies mentioned above paired together, or a combination of the above display.

FIG. 16 is an illustration of the virtual image that could be produced by the optical engine of FIG. 13 showing the resolution changes from central vision, also known as HAR, to the peripheral regions in the left and right regions 1603. A benefit of this system would be a wide FOV to maintain situational awareness while keeping the fovea satisfied with its desire for high resolution. As the HMD user's eyes track to the area of lower resolution, a very ergonomic response may be made to turn the head slightly and relatively to maintain the HAR in the central vision. If the user is focused for long enough in the area of lower acuity, they will normally become aware or subconsciously aware of the lower resolution and greater pixilation 1604 and adjust accordingly with head motion. The illustration shows horizontal areas of lower acuity but other areas could be designed as lower acuity regions, such as upper, lower, or even central vision if used for persons of known central vision loss.

The is also the embodiment of using gradients of resolution as it would appear to a user, as shown in FIG. 16. In this case the gradient may become more accentuated as observed further from central FOV 1605. This embodiment may reserve more pixels for use in the central vision region to give a wider FOV with HAR, while extending the total FOV for uses such as situational awareness. Amplification of acuity in low resolution regions could further be employed by motion detection with alarm functionality in the model controller, or by simply increasing color, contrast, brightness, object magnification, or other visual, audio, or sensory response.

Gradients of resolution have been illustrated in a rectilinear fashion but could also be used in radially decreasing patterns, as in an embodiment shown in FIG. 17, 1704. The different segments of the total FOV 1701 are diagramed with the HAR 1702 shown in an oval shape, but any shape could be used in other embodiments. The opposite could also be helpful in the case of central or regional vision loss in which areas of decreasing resolution could be increasing to the interior (central vison area). A combination could also be used with multiple regions being designed with gradients of decreasing or increasing resolution being aligned in multiple directions.

An embodiment in which the HAR and their counterpart low resolution or gradiented lower resolution regions could also be remotely controlled by using an optical engine with movable elements as in a zoom lens.

In one embodiment, the MVC may determine the ambient light and the displays may vary the brightness of the projected virtual image determined by the brightness of the ambient light.

Whereas, the devices and methods have been described in relation to the drawings and claims, it should be understood that other and further modifications, apart from those shown or suggested herein, may be made within the spirit and scope of this invention.

What is claimed is:

1. An augmented reality headset system comprising:
   one or more camera;
   at least one lens subsystem including:
   a transparent layer with a first surface and an opposed second surface;
   a reflective coating applied to the first surface of the transparent layer; and
   an alpha matte layer abutting the second surface of the transparent layer, the alpha matte layer comprising a cholesteric liquid crystal layer comprising a plurality of pixels of cholesteric liquid crystal, where each pixel is capable of independently becoming opaque or transparent;
   one or more micro-displays capable of projecting images onto the reflective coating;
   an eye-tracking subsystem capable of identifying a position of each eye;
   one or more SLAM sensors capable of detecting a distance of a target object; and
   a central processing unit in communication with and capable of controlling the cameras, micro-displays, the at least one lens subsystem, eye-tracking subsystem, and SLAM sensors;
   where the central processing unit is programmed to execute an algorithm including the steps of:
   displaying differential images on the lenses according to the position of each eye as identified by the eye-tracking subsystem based on a focal point of the target object corrected by epipolar geometry triangulation, allowing a user to see a corrected image in each eye as it relates to the distance of the target object for 3D stereo vision; and
   displaying a plurality of pixels opaque in the portion of the alpha matte layer aligning with the portion of the reflective coating onto which the differential images are projected, while pixels aligning with any portion of the reflective coating onto which no image is projected remains transparent.

2. The augmented reality headset system of claim 1 where the one or more SLAM sensors comprise a time-of-flight sensor.

3. The augmented reality headset system of claim 1 where the one or more SLAM sensors comprise two or more camera sensors.

4. The augmented reality headset system of claim 1 where the eye-tracking subsystem combined with the one or more distance sensors and epipolar geometry are capable of manipulating a field of view to gain enhanced visual acuity.

5. A method comprising:
   providing a user with an augmented reality headset, the headset comprising:
   one or more camera;
   at least one lens subsystem including:
   a transparent layer with a first surface and an opposed second surface;
   a reflective coating applied to the first surface of the transparent layer; and
   an alpha matte layer abutting the second surface of the transparent layer, the alpha matte layer comprising a cholesteric liquid crystal layer comprising a plurality of pixels of cholesteric liquid crystal, where each pixel is capable of independently becoming opaque or transparent;
   one or more micro-displays capable of projecting images onto the reflective coating;

an eye-tracking subsystem capable of identifying a position of each eye;

one or more SLAM sensors capable of detecting a distance of a target object; and a central processing unit in communication with and capable of controlling the cameras, micro-displays, the at least one lens subsystem, eye-tracking subsystem, and SLAM sensors;

identifying a position of each eye with the eye-tracking subsystem;

detecting a distance of a target object with the one or more SLAM sensors;

correcting a focal point of the target object by epipolar geometry triangulation;

displaying differential images on the lenses according to the position of each eye based on the focal point of the target object as corrected by epipolar geometry triangulation;

allowing the user to see a corrected image in each eye as it relates to the distance of any target object for 3D stereo vision; and displaying a plurality of pixels opaque in the portion of the alpha matte layer aligning with the portion of the reflective coating onto which the differential images are projected, while pixels aligning with any portion of the reflective coating onto which no image is projected remains transparent.

6. The method of claim 5 where the one or more SLAM sensors comprise a time-of-flight sensor.

7. The method of claim 5 where the one or more SLAM sensors comprise two or more camera sensors.

8. The method of claim 5 further comprising manipulating a field of view to gain enhanced visual acuity.

* * * * *